(12) United States Patent
Sumiyoshi

(10) Patent No.: US 7,333,488 B2
(45) Date of Patent: Feb. 19, 2008

(54) MULTICAST DELIVERY CONTROL APPARATUS AND METHOD

(75) Inventor: Takashi Sumiyoshi, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 605 days.

(21) Appl. No.: 11/034,753

(22) Filed: Jan. 14, 2005

(65) Prior Publication Data

US 2005/0195816 A1  Sep. 8, 2005

(30) Foreign Application Priority Data

Mar. 3, 2004 (JP) .............................. 2004-059490
Aug. 25, 2004 (JP) .............................. 2004-245348

(51) Int. Cl.
*H04L 12/56* (2006.01)
(52) U.S. Cl. ...................... 370/390; 370/432; 703/203
(58) Field of Classification Search ................ 370/389, 370/390, 432, 428, 429; 709/203, 238, 230
See application file for complete search history.

(56) References Cited

U.S. PATENT DOCUMENTS

2004/0158872 A1* 8/2004 Kobayashi .................. 725/120

FOREIGN PATENT DOCUMENTS

| JP | 2002-185528 | 12/2000 |
|---|---|---|
| JP | 2002-314599 | 4/2001 |
| JP | 2002-314600 | 4/2001 |

OTHER PUBLICATIONS

W. Fenner, "Internet Group Management Protocol, Version 2", Network Working Group, Standards Track, (Nov. 1997), 14 pages.
S. Deering et al., "Multicast Listener Discovery (MLD) for IPv6", Network Working Group, Standards Track, (Oct. 1999), 22 pages.
D. Estrin et al., "Protocol Independent Multicast-Sparse Mode (PIM-SM): Protocol Specification", Network Working Group, Experimental, (Jun. 1998), 66 pages.

* cited by examiner

*Primary Examiner*—John Pezzlo
(74) *Attorney, Agent, or Firm*—Reed Smith LLP; Stanley P. Fisher, Esq.; Juan Carlos A. Marquez, Esq.

(57) ABSTRACT

A routing/switching processing unit rewrites the inbound multicast address or the source address and the destination multicast address of the inbound flow identifier of a received packet and forwards the received packet to only output ports corresponding to a resulting outbound multicast address or flow identifier. A conversion table stores first multicast addresses or flow identifiers designated by transmission sources, second multicast addresses or flow identifiers to be used for forwarding to users data transmitted from the transmission sources, and signal port IDs of signal ports to which the users are connected. A multicast packet processing unit converts the first multicast address or flow identifier of a received multicast packet to a second multicast packet or flow identifier by referring to the conversion table, and forwards the address-converted packet to network interfaces having signal ports corresponding to the second multicast packet or flow identifier.

52 Claims, 28 Drawing Sheets

| PORT | INBOUND ADDRESS | OUTBOUND ADDRESS |
|---|---|---|
| P1 | M1 | M |
| P2 | M2 | M |
| P3 | M3 | M |

(a) CONVERSION TABLE

| INBOUND ADDRESS | OUTBOUND ADDRESS | PORT | OPERATION |
|---|---|---|---|
| M1 | M | P1 | ADD |
| M2 | M | P2 | ADD |
| M2 | M | P3 | ADD |

(b) CONVERSION TABLE UPDATE INFORMATION

| MULTICAST ADDRESS | DESTINATION PORT |
|---|---|
| M | P1, P2 |
| ⋮ | ⋮ |

(c) MALTICAST GROUP MANAGEMENT TABLE

| INBOUND ADDRESS | OUTBOUND ADDRESS |
|---|---|
| M1 | M |
| M2 | M |
| M3 | M |

(d) CONVERSION TABLE (VARIATION)

FIG. 4

| PORT | USER ID |
|---|---|
| P1 | User1 |
| P2 | User2 |
| P3 | User3 |

(a) USER CONNECTION INFORMATION

| USER ID | INBOUND ADDRESS | OUTBOUND ADDRESS |
|---|---|---|
| User1 | M1 | M |
| User2 | M2 | M |
| User3 | M3 | M |

(b) USER ASSIGNMENT TABLE UPDATE REQUEST

| INBOUND ADDRESS | OUTBOUND ADDRESS | PORT | OPERATION |
|---|---|---|---|
| M1 | M | P1 | ADD |
| M2 | M | P2 | ADD |
| M2 | M | P3 | ADD |

(c) CONVERSION TABLE UPDATE INFORMATION

FIG. 9

| INBOUND ADDRESS | OUTBOUND ADDRESS | PORT |
|---|---|---|
| E1 | M | P1 |
| E1 | M | P2 |

(a) CONVERSION TABLE

| INBOUND ADDRESS | OUTBOUND ADDRESS | PORT |
|---|---|---|
| C1 | M | P1 |
| C2 | M | P2 |

(c) CONVERSION TABLE

351

| INBOUND ADDRESS | OUTBOUND ADDRESS | PORT | OPERATION |
|---|---|---|---|
| E1 | M | P1 | DELETE |
| E1 | M | P2 | DELETE |
| C1 | M | P1 | ADD |
| C2 | M | P2 | ADD |

(b) CONVERSION TABLE UPDATE INFORMATION

FIG. 12

| PORT | USER ID |
|---|---|
| P1 | User1 |
| P2 | User2 |
| P3 | User3 |

(a) USER CONNECTION INFORMATION 404

| PORT | SEX | AGE |
|---|---|---|
| P1 | MALE | 20S |
| P2 | FEMALE | 20S |
| P3 | FEMALE | 30S |

(c) PROFILE GROUP TABLE 401

| USER ID | SEX | AGE |
|---|---|---|
| User1 | MALE | 20S |
| User2 | FEMALE | 20S |
| User3 | FEMALE | 30S |

(b) USER PROFILE INFORMATION 405

| SEX | AGE | INBOUND ADDRESS | OUTBOUND ADDRESS |
|---|---|---|---|
| MALE | 20S~30S | M1 | M |
| FEMALE | 20S~30S | M2 | M |
| DON'T CARE | 40S | M3 | M |

(d) PROFILE ASSIGNMENT TABLE UPDATE REQUEST 406 (402)

| INBOUND ADDRESS | OUTBOUND ADDRESS | PORT | OPERATION |
|---|---|---|---|
| M1 | M | P1 | ADD |
| M2 | M | P2 | ADD |
| M2 | M | P3 | ADD |

(e) CONVERSION TABLE UPDATE INFORMATION 403

FIG. 16

| PORT | USER ID |
|---|---|
| P1 | User1 |
| P2 | User2 |
| P3 | User3 |

(a) USER CONNECTION INFORMATION 414

| USER ID | SEX | AGE |
|---|---|---|
| User1 | MALE | 20S |
| User2 | FEMALE | 20S |
| User3 | FEMALE | 30S |

(b) USER PROFILE INFORMATION 415

| USER GROUP ID | SEX | AGE |
|---|---|---|
| Group1 | MALE | 20S TO 30S |
| Group2 | FEMALE | 20S TO 30S |
| Group3 | DON'T CARE | 40S |

(C) USER GROUP DEFINITION 416

| PORT | USER GROUP ID |
|---|---|
| P1 | Group1 |
| P2 | Group2 |
| P3 | Group2 |

(d) USER GROUP TABLE 411

| USER GROUP ID | INBOUND ADDRESS | OUTBOUND ADDRESS |
|---|---|---|
| Group1 | M1 | M |
| Group2 | M2 | M |
| Group3 | M3 | M |

(e) GROUP ASSIGNMENT TABLE UPDATE REQUEST 417

| INBOUND ADDRESS | OUTBOUND ADDRESS | PORT | OPERATION |
|---|---|---|---|
| M1 | M | P1 | ADD |
| M2 | M | P2 | ADD |
| M2 | M | P3 | ADD |

(f) CONVERSION TABLE UPDATE INFORMATION 413

Fig.19

(a) CONVERSION TABLE

| INBOUND FLOW IDENTIFIER | | OUTBOUND FLOW IDENTIFIER | | PORT |
|---|---|---|---|---|
| SOURCE ADDRESS | DESTINATION ADDRESS | SOURCE ADDRESS | DESTINATION ADDRESS | |
| S1 | G1 | S | G | P1 |
| S2 | G1 | S | G | P2 |

(b) CONVERSION TABLE UPDATE INFORMATION

| INBOUND FLOW IDENTIFIER | | OUTBOUND FLOW IDENTIFIER | | PORT | OPERATION |
|---|---|---|---|---|---|
| SOURCE ADDRESS | DESTINATION ADDRESS | SOURCE ADDRESS | DESTINATION ADDRESS | | |
| S1 | G1 | S | G | P1 | DELETE |
| S2 | G2 | S | G | P2 | DELETE |
| S3 | G1 | S | G | P1 | ADD |
| S4 | G2 | S | G | P2 | ADD |
| S1 | G1 | DISCARD | DISCARD | P1 | ADD |
| S2 | G2 | DISCARD | DISCARD | P2 | ADD |

(c) CONVERSION TABLE

| INBOUND FLOW IDENTIFIER | | OUTBOUND FLOW IDENTIFIER | | PORT |
|---|---|---|---|---|
| SOURCE ADDRESS | DESTINATION ADDRESS | SOURCE ADDRESS | DESTINATION ADDRESS | |
| S3 | G1 | S | G | P1 |
| S4 | G2 | S | G | P2 |
| S1 | G1 | DISCARD | DISCARD | P1 |
| S2 | G2 | DISCARD | DISCARD | P2 |

Fig.23

| INBOUND FLOW IDENTIFIER | | OUTBOUND FLOW IDENTIFIER | PORT |
|---|---|---|---|
| SOURCE ADDRESS | DESTINATION ADDRESS | DESTINATION ADDRESS | |
| S1 | G1 | G | P1 |
| S2 | G2 | G | P2 |

(a) CONVERSION TABLE (VARIATION)

| INBOUND FLOW IDENTIFIER | | OUTBOUND FLOW IDENTIFIER | PORT |
|---|---|---|---|
| SOURCE ADDRESS | DESTINATION ADDRESS | SOURCE ADDRESS | |
| S1 | G1 | S | P1 |
| S2 | G1 | S | P2 |

(b) CONVERSION TABLE (VARIATION)

| INBOUND FLOW IDENTIFIER | | PORT |
|---|---|---|
| SOURCE ADDRESS | DESTINATION ADDRESS | |
| S1 | G1 | P1 |
| S2 | G1 | P2 |

(c) CONVERSION TABLE (VARIATION)

Fig.26

MULTICAST GROUP MANAGEMENT TABLE

| REQUEST FLOW IDENTIFIER | | DESTINATION PORT |
|---|---|---|
| SOURCE ADDRESS | DESTINATION ADDRESS | |
| S | G | P1, P2 |
| | | |

Fig.27

| REQUEST FLOW IDENTIFIER | DESTINATION PORT |
|---|---|
| DESTINATION ADDRESS | |
| G | P1, P2 |
| | |

(a)

| REQUEST FLOW IDENTIFIER | | DESTINATION PORT |
|---|---|---|
| SOURCE ADDRESS | DESTINATION ADDRESS | |
| S | G | P1, P2 |
| | | |

(b)

| REQUEST FLOW IDENTIFIER | DESTINATION PORT |
|---|---|
| DESTINATION ADDRESS | |
| G | P1, P2 |
| | |

MULTICAST DELIVERY CONTROL APPARATUS AND METHOD

CLAIM OF PRIORITY

The present application claims priority from Japanese applications JP 2004-059490 filed on Mar. 3, 2004 and JP 2004-245348 filed on Aug. 25, 2004, the contents of which are hereby incorporated by reference into this application.

BACKGROUND OF THE INVENTION

1. Field of the Invention

The present invention relates to a multicast delivery control apparatus and method for content delivery using a multicast network.

2. Description of the Related Art

The multicast technique is effective in transmitting packets having the same content to a plurality of terminals. Receivers send to a router reception requests of multi cast address indicating content they want to receive, and the router generates a delivery tree. Content that is delivered to a multi cast address is copied, when necessary, at nodes of a network according to the delivery tree and is forwarded to receivers. Multicast delivery on an IP network is realized by using a multicast group management protocol such as internet group management protocol (IGMP) or multicast listener discovery (MLD) or a multicast routing protocol such as protocol independent multicast-sparse mode (PIM-SM).

Since the multicast is a technique capable of efficiently transmitting the same content to all receivers, it may be used in the form of a content broadcast for causing many receivers to simultaneously view a large amount of data such as multimedia content. However, there may be a case that it is effective to deliver, in accordance with their respective states, different pieces of content to receivers who sent the same reception request. For example, in ground-wave broadcast, news and weather forecasts suitable for respective receiver regions are delivered to those respective regions. If commercial messages that would attract each user (viewer) can be inferred correctly on the basis of his or her sex, age, etc. and delivered to him or her, advertisers are enabled to deliver effective advertisements and users need not view uninteresting advertisements. To cut the costs of such redundant delivery of content and allow the content provider side to form content structures flexibly, a mechanism is needed that allows the sender side to switch content to be received by each user. Another mechanism is also needed that enables efficient content switching in accordance with the profile of each of many users.

In the related art, a method for realizing such delivery with switching of multicast content in accordance with the profile of each user is such that users who want to have different pieces of content delivered are caused to join to different multicast addresses in advance and the pieces of content are delivered to those addresses. Another method is such that an instruction to change the reception channel is sent externally to each user terminal as appropriate.

Related prior art references are:
JP-A-2002-314599
JP-A-2002-314600
RFC2236 Internet Group Management Protocol, Version 2
FRC2710 Multicast Listener Discovery (MLD) for IPv6
RFC2362 Protocol Independent Multicast-Sparse Mode (PIM-SM)

However, the method that users who want to have different pieces of content delivered are caused to join to different multicast addresses in advance is not flexible because it is necessary to determine a delivery schedule before opening the multicast addresses to the users. Further, to deliver the same content to users who are members of different multicast addresses, a problem arises a sender must send multicast packets to the respective groups.

A method that a reception multicast address conversion instruction is issued to each client has the following problem.

First, every client needs to introduce software that has a function of generating an IGMP or MLD packet according to the received instruction and transmitting it: a software introduction cost and a terminal processing cost at the time of conversion are incurred. Where authentication is performed on a multicast address basis, an authentication process needs to be executed, though in the same authorization unit, every time content switching is performed, which increases the overhead.

Where authentication is not performed, a receiver is rendered in a receivable state only if he or she sends a request to join a group. Therefore, if a conversion instruction to a client is disregarded because of network trouble or by intention of a receiver, it is unavoidable that the receiver receives content that is not intended by a content provider.

SUMMARY OF THE INVENTION

The present invention has been made in view of the above circumstances in the art, and an object of the invention is therefore to provide a multicast delivery control apparatus and method capable of performing a content delivery control while reducing the load of each receiving terminal by providing a means for or converting an inbound source address or multicast address of a content egress to an inbound source address or multicast address of a content ingress and a means for or step of delivering pieces of content to a plurality of receivers while selecting content most suitable for delivery to each receiver on the basis of information about each receiver.

According to the first solving means, there is provided a multicast delivery control apparatus which performs forwarding processing on a packet that is multicast-transmitted from a data transmission source by using a multicast address, comprising:

at least one network interface having signal ports for packet transmission and reception;

a conversion table for storing first multicast addresses that are designated by transmission sources and second multicast addresses to which users belong to whom data transmitted from transmission sources are to be delivered finally or who requested reception of data transmitted from transmission sources;

a multicast packet processing unit for converting a first multicast address of a received multicast packet to a second multicast address by referring to the conversion table, and for transmitting the address-converted multicast packet to a network interface having a signal port corresponding to the second multicast address; and a switch unit for interconnecting the at least one network interface, the conversion table, and the multicast packet processing unit.

According to the second solving means, there is provided a multicast delivery control method for performing forwarding processing on a packet that is multicast-transmitted from a data transmission source by using a multicast address, comprising the steps of:

receiving a multicast packet from a signal port;

acquiring a list of second multicast addresses on the basis of a first multicast address of the received multicast packet by referring to a conversion table for storing first multicast addresses that are designated by transmission sources and second multicast addresses to which users belong to whom data transmitted from transmission sources are to be delivered finally or who requested reception of data transmitted from transmission sources;

determining destination signal ports on the basis of the second multicast addresses by referring to a multicast group management table for storing correspondence between the second multicast addresses and destination signal port IDs of packets; and changing a destination address of the received multicast packet to a second multicast address and forwarding the multicast packet to the signal ports.

According to the third solving means, there is provided a multicast delivery control method for performing forwarding processing on a packet that is multicast-transmitted from a data transmission source by using a multicast address, comprising the steps of:

receiving a multicast packet from a signal port;

acquiring a list of a second multicast address and destination signal ports on the basis of a first multicast address of the received multicast packet by referring to a conversion table for storing first multicast addresses that are designated by transmission sources, second multicast addresses to which users belong to whom data transmitted from transmission sources are to be delivered finally or who requested reception of data transmitted from transmission sources, and signal port IDs corresponding to the first multicast addresses and the second multicast addresses;

referring to a multicast group management table for storing correspondence between the second multicast addresses and destination signal port IDs of packets, and eliminating signal ports that do not exist in the multicast group management table from the list; and changing a destination address of the received multicast packet to the second multicast address and forwarding the multicast packet to the signal ports in the list.

According to the forth solving means, there is provided a multicast delivery control apparatus which performs forwarding processing on a packet that is multicast-transmitted from a data transmission source by using a multicast address, comprising:

at least one network interface having signal ports for packet transmission and reception;

a conversion table for storing first flow identifiers including first source addresses representing server identifiers of transmission sources and first destination multicast addresses that are designated by the transmission sources for content delivery, and second flow identifiers corresponding to the first flow identifiers and including at least one of second source addresses and second destination multicast addresses that are used for multicast requests by users to receive multicast packets;

a multicast packet processing unit for converting a first flow identifier of a received multicast packet to a second flow identifier by referring to the conversion table, and for transmitting the address-converted multicast packet to a network interface having a signal port ID corresponding to the second flow identifier; and a switch unit for interconnecting the at least one network interface, the conversion table, and the multicast packet processing unit.

According to the fifth solving means, there is provided a multicast delivery control apparatus which performs forwarding processing on a packet that is multicast-transmitted from a data transmission source by using a multicast address, comprising:

at least one network interface having signal ports for packet transmission and reception;

a conversion table for storing first flow identifiers including first source addresses representing server identifiers of transmission sources and first destination multicast addresses that are designated by the transmission sources for content delivery, and signal port IDs corresponding to the first flow identifiers;

a multicast packet processing unit for forwarding a received multicast packet to signal ports having signal port IDs corresponding to a first flow identifier of the received packet by referring to the conversion table; and a switch unit for interconnecting the at least one network interface, the conversion table, and the multicast packet processing unit.

According to the sixth solving means, there is provided a multicast delivery control method for performing forwarding processing on a packet that is multicast-transmitted from a data transmission source by using a multicast address, comprising the steps of:

receiving a multicast packet from a signal port;

acquiring a list of second flow identifiers on the basis of a first flow identifier of the received multicast packet by referring to a conversion table for storing first flow identifiers including first source addresses representing server identifiers of transmission sources and first destination multicast addresses that are designated by the transmission sources for content delivery, and second flow identifiers corresponding to the first flow identifiers and including at least one of second source addresses and second destination multicast addresses that are used for multicast requests by users to receive multicast packets;

determining destination signal ports on the basis of the second flow identifiers in the list by referring to a multicast group management table for storing correspondence between the second flow identifiers and destination signal port IDs of packets; and changing a destination address of the received multicast packet to a second flow identifier and forwarding the multicast packet to the signal ports.

According to the seventh solving means, there is provided a multicast delivery control method for performing forwarding processing on a packet that is multicast-transmitted from a data transmission source by using a multicast address, comprising the steps of:

receiving a multicast packet from a signal port;

acquiring a list of destination signal ports on the basis of a first flow identifier of the received multicast packet, by referring to a conversion table for storing first flow identifiers including first source addresses representing server identifiers of transmission sources and first destination multicast addresses that are designated by the transmission sources for content delivery, and signal port IDs corresponding to the first flow identifiers;

forwarding the multicast packet to signal ports in the list.

The invention can provide a network system for multicast delivery in which the delivering side performs a real-time content delivery control on a sub network basis or a user basis without imposing such loads as transmission of a reception request or authentication packets for switching on receiving terminals.

The present invention can apply to not only contents delivering system but also various apparatuses for delivering multicast packet in a network to deliver by switching packet stream.

BRIEF DESCRIPTION OF THE DRAWINGS

FIGS. 4A-4D show the structures of an exemplary conversion table (minimal structure) and multicast group management table;

FIGS. 9A-9C show the structure of another exemplary conversion table;

FIGS. 12A-12C show an example of application of conversion table update information to a conversion table used in the multicast packet forwarding device;

FIGS. 16A-16E show examples of various kinds of information and a table that are used in the first conversion table update information construction device;

FIGS. 19A-19F show examples of various kinds of information and a table that are used in the second conversion table update information construction device;

FIGS. 23A-23C show an example of application of conversion table update information to a conversion table used in the multicast packet forwarding device;

FIGS. 26A-26C show modifications of the conversion table;

FIG. 27 shows an exemplary multicast group management table; and

FIGS. 28A-28C show modifications of the multicast group management table.

DESCRIPTION OF THE PREFERRED EMBODIMENTS

1. First Embodiment of Multicast Delivery Control Apparatus and Method

Embodiments of the present invention will be hereinafter described with reference to the drawings.

Figure 1:
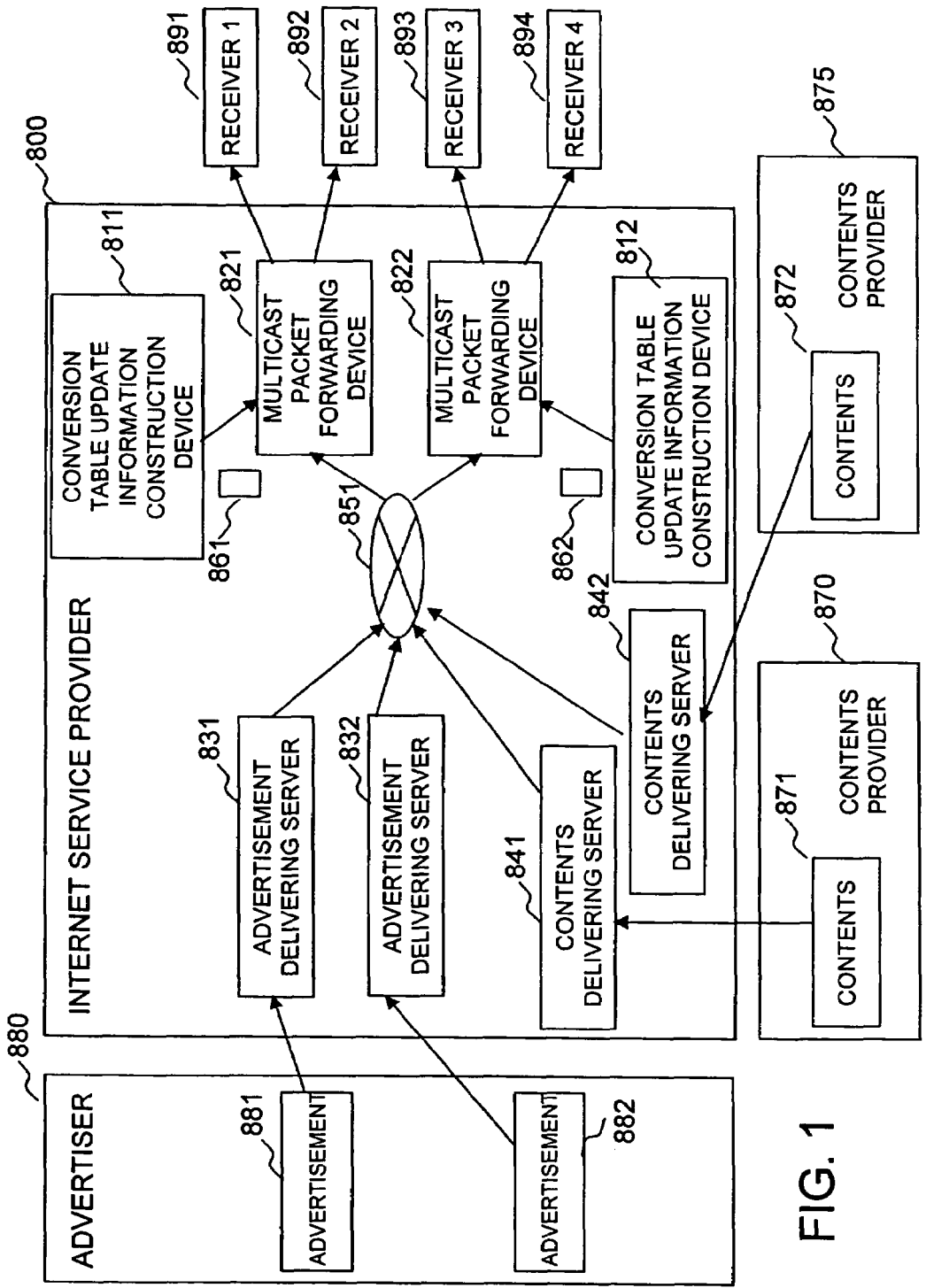
FIG. 1 shows a multicast delivery system using multicast using packet forwarding devices according to a first embodiment of the present invention.

FIG. 1 shows a multicast network to which a multicast delivery control apparatus and method according to a first embodiment of the invention are applied. The multicast delivery control apparatus is equipped with multicast packet forwarding devices 821 and 822 or both of the multicast packet forwarding devices 821 and 822 and conversion table update information construction devices 811 and 812.

In this example, an Internet service provider (ISP) 800 receives advertisements 881 and 882 from an advertiser 880 and delivers those to receivers using content servers (advertisement delivering servers) 831 and 832. Further, the Internet service provider 800 purchases pieces of content 871 and 872 from content providers 870 and 875 and delivers those to receivers using content servers (content delivering servers) 841 and 842.

As shown in FIG. 1, the content servers 831, 832, 841, and 842 and the multicast packet forwarding devices 821 and 822 are connected to a multicast network 851. Receivers 891 and 892 and the conversion table update information construction device 811 are connected to the multicast packet forwarding device 821, and receivers 893 and 894 and the conversion table update information construction device 812 are connected to the multicast packet forwarding device 822. The content servers 831, 832, 841, and 842 transmit, to the multicast network 851, multicast packets that are directed to different multicast addresses C1, C2, E1, and E2, respectively. The multicast network 851 transmits those multicast packets to the multicast packet forwarding devices 821 and 822 that sent reception requests. The multicast packet forwarding devices 821 and 822 update internal conversion tables 301 on the basis of pieces of conversion table update information 861 and 862 supplied from the conversion table update information construction devices 811 and 812, respectively, and forward the received multicast packets to the receivers who sent reception requests and are connected thereto by converting destination addresses contained in the received multicast packets according to the internal conversion tables 301.

Each of the conversion table update information construction devices 811 and 812 is a device for transmitting conversion table update information to the multicast packet forwarding device on the basis of an input from an operator, a content delivery time table, or the like.

Figure 2:
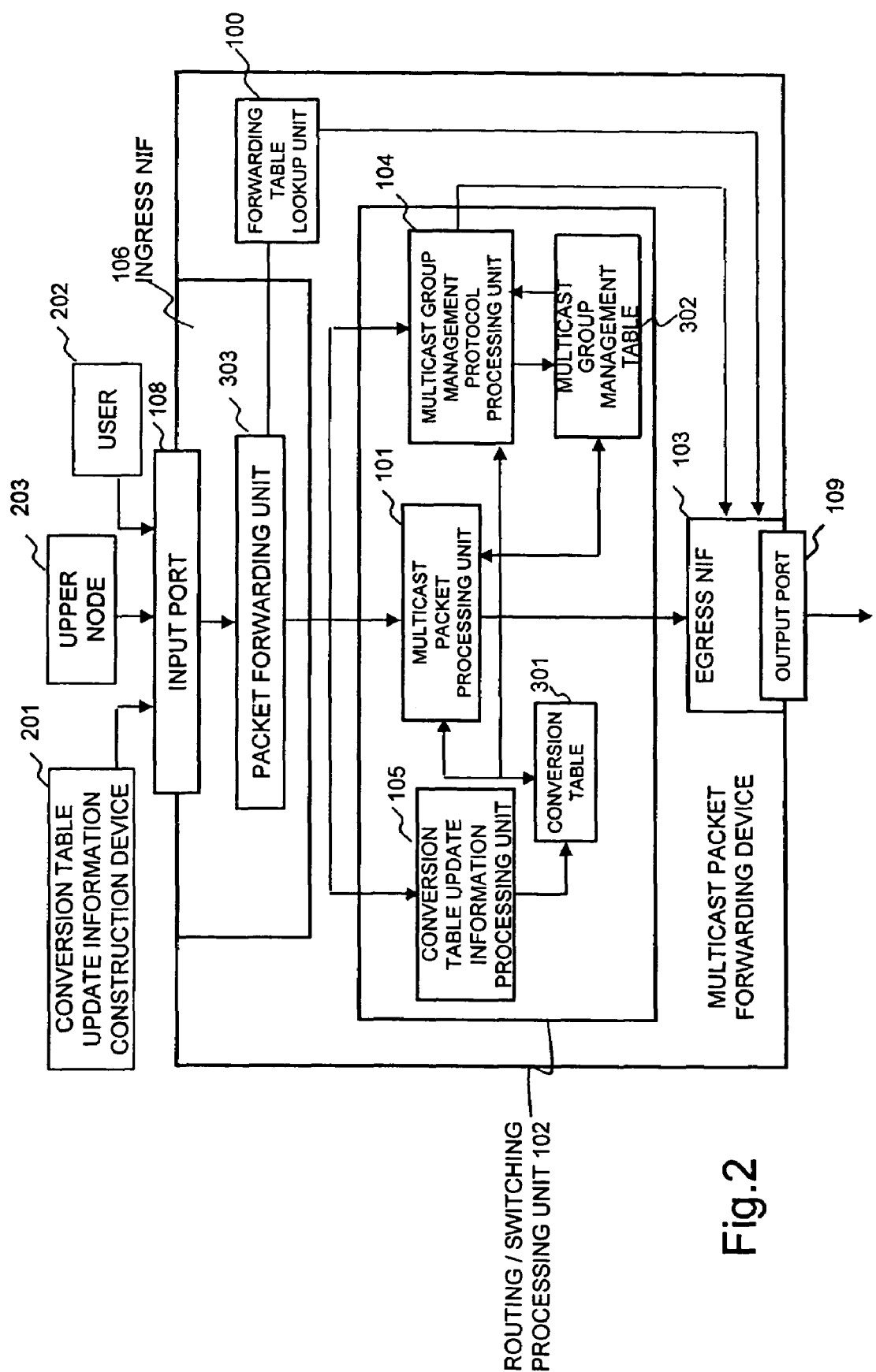
FIG. 2 shows the configuration of an exemplary multicast packet forwarding device.

FIG. 2 shows the configuration of each of the multicast packet forwarding devices 821 and 822. Each of the multicast packet forwarding devices 821 and 822 is equipped with an ingress NIF 106, an egress NIF 103, and a routing/switching processing unit 102. The routing/switching processing unit 102 is equipped with a multicast packet processing unit 101 and a multicast group management protocol processing unit 104. The routing/switching processing unit 102 receives a multicast packet, a multicast reception request/unrequest, conversion table update information, etc. via an input port 108 and processes those.

The basic operations of each of the multicast packet forwarding devices 821 and 822 are as follows.

(a) Receives a packet through an input port 108.

(b) A packet forwarding unit 303 judges whether a reception packet requires address conversion (specifically, this is done in the NIF by a header analysis).

(c) The packet forwarding unit 303 forwards a packet that requires conversion to the routing/switching processing unit 102. On the other hand, the packet forwarding unit 303 forwards a packet that does not require conversion to a forwarding table lookup unit 100, which searches for a prescribed forwarding destination and transmits the packet via the egress NIF 103.

(d) The routing/switching processing unit 102 forwards an address-converted multicast packet to the egress NIF 103 that includes prescribed signal ports (output ports) 109. For example, signal port information is contained in the conversion table 301 or obtained by referring to a multicast management table 302.

(e) The egress NIF 103 transmits the packet.

FIGS. 4A-4D show the structures of an exemplary conversion table (minimal structure) and multicast group management table. As shown in FIG. 4A, a connection port ID, an inbound address that is designated by a sender, and an outbound address to which a user to whom data transmitted from the sender is delivered finally (or who requested reception of data transmitted from the sender) belongs are stored in the conversion table 301 so as to be correlated with each other. As shown in FIG. 4B, an inbound address, an outbound address, a connection port ID, and an operation (add, delete, or the like) are stored as conversion table update information so as to be correlated with each other. FIG. 4C shows an example of the multicast group management table 302. Destination port and a request multicast address are stored in the multicast group management table 302 so as to be correlated with each other. FIG. 4D shows a modified version of the conversion table 301 in which an inbound address and an outbound address are stored so as to be correlated with each other. The conversion table of FIG. 4A is updated according to the conversion table update information of FIG. 4B. Details will be described later.

Each kind of processing performed by the multicast packet forwarding devices will be described below.

(1) Multicast Packet Reception Processing

Figure 5:
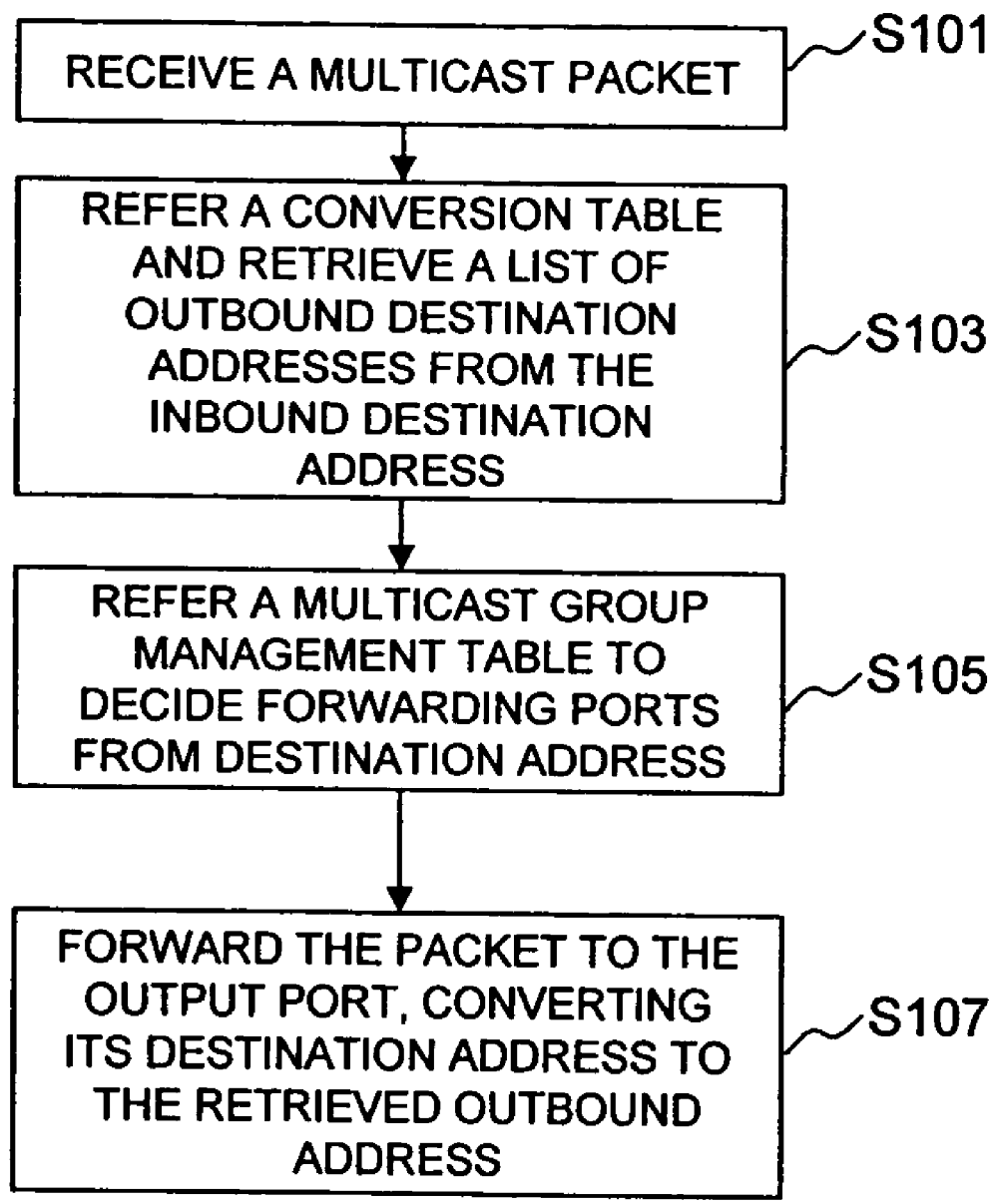
FIG. 5 shows an operation that is performed by the multicast packet forwarding device in receiving a multicast packet.

FIG. 5 shows an operation that is performed by each of the multicast packet forwarding devices in receiving a multicast packet.

Figure 6:
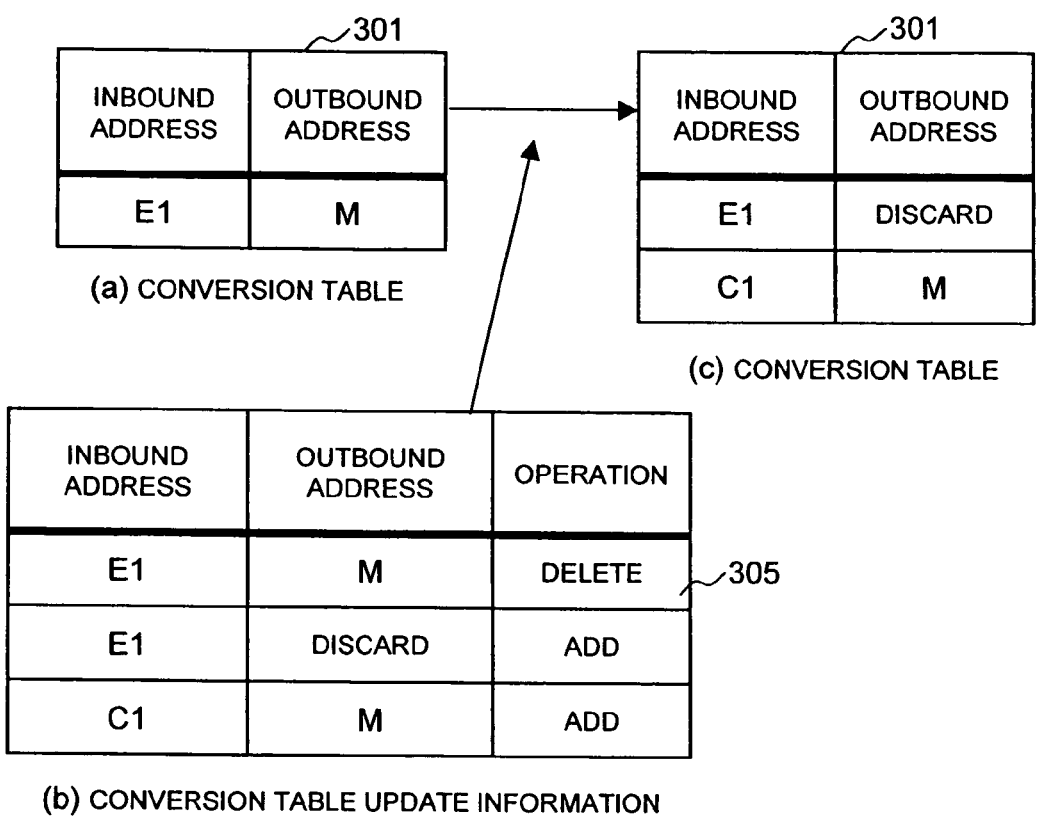
FIGS. 6A-6C show an example of application of conversion table update information to the conversion table used in the multicast packet forwarding device.

The operation that is performed in receiving a multicast packet will be described below with reference to FIGS. 2 and 5. At step S101, the routing/switching unit 102 of each of the multicast packet forwarding devices 821 and 822 receives a multicast packet from one of the content servers 831, 832, 841, and 842 (i.e., upper node 203) via an input port 108 and the packet forwarding unit 303. At step S103, the multicast packet processing unit 101 searches the inbound address fields of the conversion table 301 for an inbound address that coincides with the destination address of the received multicast packet, and acquires the information of the outbound address field of a coincidence-found entry (the conversion table is referred to and a list of outbound destination addresses are retrieved on the basis of the inbound destination address). For example, in the case of using the conversion table 301 of FIG. 4A, an outbound address M is acquired when the inbound address is M1 (symbol "E1" is used in FIG. 6 etc.).

At step S105, the routing/switching processing unit 102 searches the request group address fields of the multicast group management table 302 for an address that coincides with the outbound address acquired by the multicast packet processing unit 101, and acquires the information of the packet destination port ID field of a coincidence-found entry. At step S107, the routing/switching processing unit 102 gives the acquired information to the egress NIF 103. For example, in the case of using the multicast group management table 302 of FIG. 4C, destination port P1 and P2 are acquired for the outbound address M. The egress NIF 103 converts the destination address of the packet to the outbound address that was determined by the multicast packet processing unit 101, and outputs the resulting multicast packet to the destination ports that are specified by the routing/switching processing unit 102.

Data indicating default processing that should be performed when no match is found with any record may be entered in an inbound address field of the conversion table 301, and data indicating that the destination address should be discarded rather than is converted may be entered in an outbound address. This enables a control of discarding a packet that is directed to a certain multicast address or an unregistered multicast address, thereby preventing its forwarding to receivers.

(2) Processing of Receiving a Multicast Reception Request/Unrequest

Figure 7:
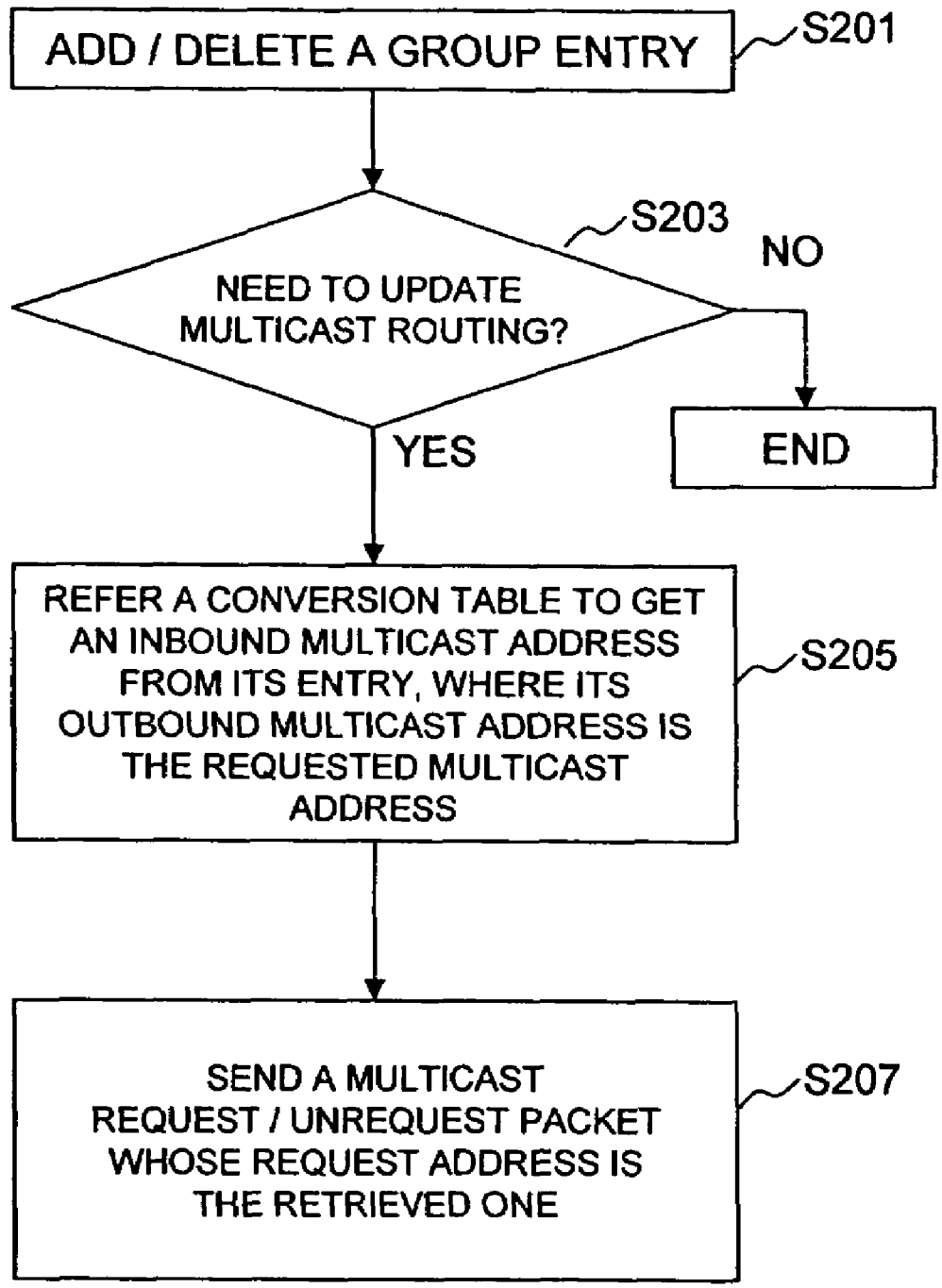
FIG. 7 shows an operation that is performed by the multicast packet forwarding device at the time of group entry registration/cancellation.

FIG. 7 shows an operation that is performed in each of the multicast packet forwarding devices at the time of group entry registration/cancellation.

An operation that is performed when a multicast reception request/unrequest 304 is received will be described below with reference to FIGS. 2 and 7.

At step S201, when the routing/switching processing unit 102 of the multicast packet forwarding unit 821 or 822 receives a multicast reception request/unrequest 304 from one of the receivers 891-894 (i.e., user 202), the multicast group management protocol processing unit 104 updates the multicast group management table 302 by performing an operation prescribed by a multicast group management protocol. For example, in the case of IGMP, when an IGMP membership report is received, the multicast group management protocol processing unit 104 adds, to the multicast group management table 302, an entry corresponding to the request multicast address of a received packet and a reception port, thereby setting a group timer and storing the fact that it is necessary to forward, to the reception port, a packet that is directed to the request multicast address.

When a timeout has occurred in the group timer and hence it has become unnecessary to forward, to the port concerned, a packet that is directed to the multicast address concerned, the multicast group management protocol processing unit 104 deletes the entry concerned from the multicast group management table 302.

At step S203, the multicast group management protocol processing unit 104 judges whether it has become necessary to transmit a multicast packet reception request/unrequest to the upper node 203 as a result of the updating of the multicast group management table 302. An example is a change from a state that receivers are connected to the multicast packet forwarding device 821 or 822 to a state that no receivers are connected to it, or vice versa. In this case, at step S205, the conversion table 301 is referred to, an entry of the conversion table 301 having an outbound address that coincides with the request multicast address of the entry concerned is searched for, and the address of the inbound address field of a coincidence-found entry is acquired. The multicast group management protocol processing unit 104 instructs the egress NIF 103 to transmit a multicast request/ unrequest to the acquired address. However, depending on the form of the network operation, there may occur a case that a plurality of outbound addresses correspond to the same inbound address in the conversion table 301. For such a network operation, whether to send a multicast packet reception request/unrequest to the upper node needs to be judged for each inbound address. Outbound addresses from which a request was issued to the upper router are stored for each inbound address. The multicast group management protocol processing unit 104 instructs the egress NIF 103 to transmit a reception request to the upper router if a transition is made from a state that no outbound address exists to a state that at least one outbound address exists, and instructs the egress NIF 103 to transmit a reception unrequest to the upper router if a transition is made from a state that at least one outbound address exists to a state that no outbound address exists. The egress NIF 103 outputs a specified packet to a port of the upper node (S207).

(3) Processing of Receiving Conversion Table Update Information

FIGS. 6A-6C show an example of application of conversion table update information to the conversion table used in each of the multicast packet forwarding devices. In this example, as shown in FIG. 6A, an outbound address and an inbound address are stored in the conversion table 301 so as to be correlated with each other. FIG. 6B shows conversion table update information 305 and FIG. 6C shows an updated conversion table 301. Before the updating, an inbound address field E1 and an outbound address field M are stored in the conversion table 301 as shown in FIG. 6A.

An operation that is performed when conversion table update information 305 is received will be described below with reference to FIG. 2 and FIGS. 6A-6C.

When the multicast packet forwarding device 821 or 822 receives conversion table update information 325 from the conversion table update information construction device 811 or 812 (201), a conversion table update information processing unit 105 updates the conversion table 301. The conversion table update information 305 is information that is necessary for updating of the conversion table 301. That is, the conversion table update information 305 assumes a table as shown in FIG. 6B that has inbound address fields, outbound address fields, and operation fields and indicates differences that will be caused in the conversion table by updating. If the conversion table update information 305 of FIG. 6B is applied to the conversion table 301 of FIG. 6A, the conversion table 301 of FIG. 6C is obtained. In this example, a state that a packet is forwarded to receivers by converting the multicast address E1 to the multicast address M is changed to a state that a packet directed to the multicast address E1 is discarded in the apparatus concerned and a packet directed to a multicast address C1 is forwarded to the receivers through conversion to the multicast address M.

Although content that is received by each receiver is changed because of the updating of the conversion table, each receiver still receives packets having the multicast address M and no processing is performed to handle a reception request, a reception unrequest, or the like. In systems in which authentication needs to be performed at the time of issuance of a reception request, content switching does not require re-authentication.

The conversion table update information construction devices 811 and 812 are devices for transmitting conversion table update information 305 to the multicast delivery control apparatus on the basis of an input from an operator, a content delivery time table, or the like.

FIGS. 9A-9C show the structure of another form of conversion table 301. In this example, the conversion table is realized by a connection information table and a user assignment table. As for connection information of FIG. 9A, a user ID and a connection port ID are stored so as to be correlated with each other. As for a user assignment table update request of FIG. 9B, a user ID, an inbound address, and an outbound address are stored so as to be correlated with each other. FIG. 9C shows conversion table update information for such a substitution table structure. An inbound address, an outbound address, a connection port ID, and an operation (add, delete, or the like) are stored so as to be correlated with each other. The above-described (1) multicast packet reception processing, (2) processing of receiving a multicast reception request/unrequest, and (3) processing of receiving conversion table update information can also be realized by using the conversion table of FIGS. 9A-9C.

2. Second Embodiment of Multicast Delivery Control Apparatus and Method

Figure 10:
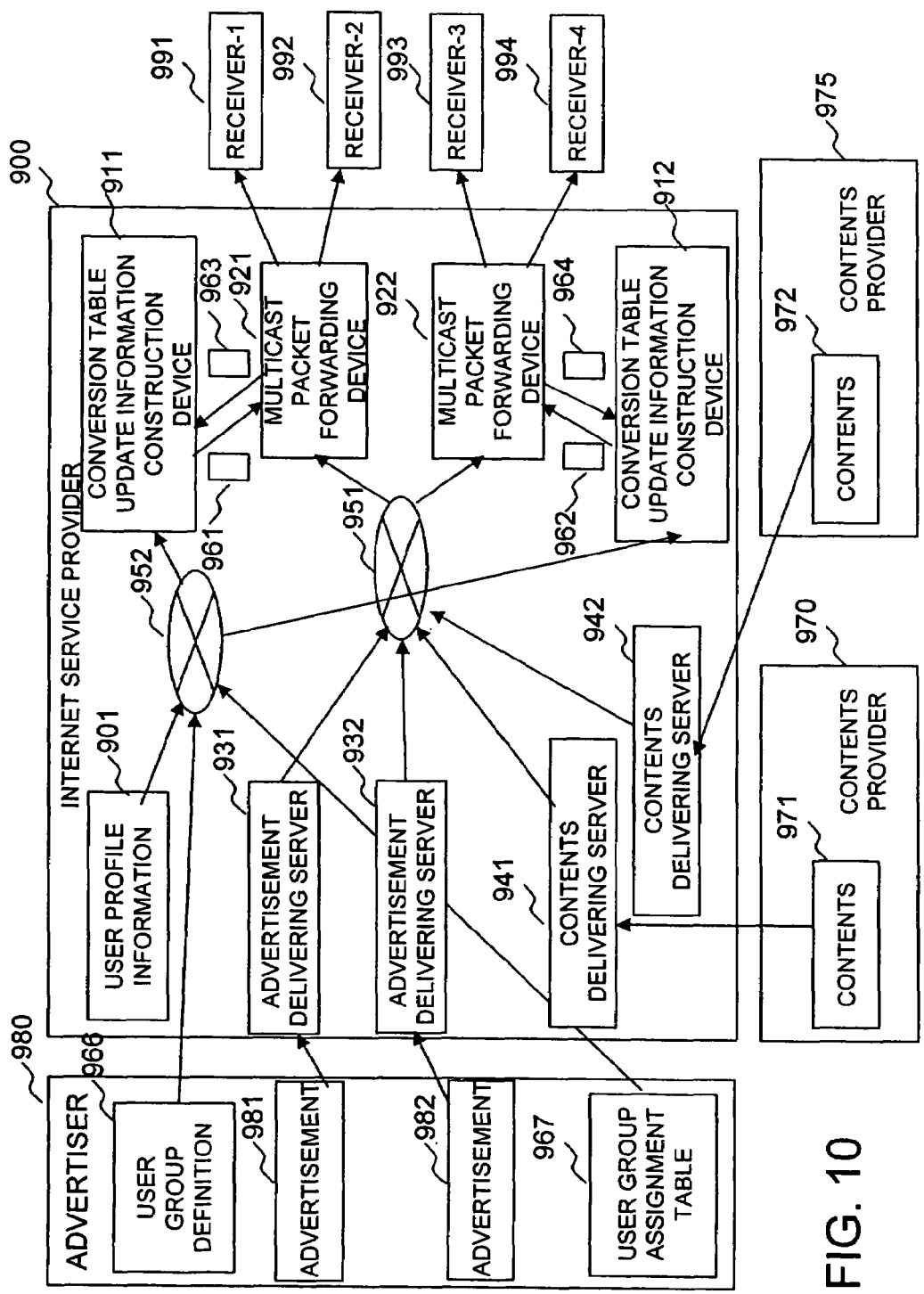
FIG. 10 shows a multicast delivery system using multicast using packet forwarding devices according to a second and third embodiments of the invention.

FIG. 10 shows a multicast network to which a multicast delivery control apparatus and method according to a second embodiment of the invention are applied. The multicast delivery control apparatus is equipped with multicast packet forwarding devices 921 and 922 or both of the multicast packet forwarding devices 921 and 922 and conversion table update information construction devices 911 and 912.

In this example, an Internet service provider (ISP) 900 receives advertisements 981 and 982 from an advertiser 980 and delivers those to receivers using content servers (advertisement delivering servers) 931 and 932. Further, the Internet service provider 900 purchases pieces of content 971 and 972 from content providers 970 and 975 and delivers those to receivers using content servers (content delivering servers) 941 and 942.

As shown in FIG. 10, the content servers 931, 932, 941, and 942 and the multicast packet forwarding devices 921 and 922 are connected to a multicast network 951. Receivers 991 and 992 and the conversion table update information construction device 911 are connected to the multicast packet forwarding device 921, and receivers 993 and 994 and the conversion table update information construction device 912 are connected to the multicast packet forwarding device 922. The content servers 931, 932, 941, and 942 transmit, to the multicast network 951, multicast packets that are directed to different multicast addresses C1, C2, E1, and E2, respectively. The multicast network 951 transmits those multicast packets to the multicast packet forwarding devices 921 and 922 that sent reception requests. The multicast packet forwarding devices 921 and 922 update internal conversion tables 301 on the basis of pieces of conversion table update information 961 and 962 supplied from the conversion table update information construction devices 911 and 912, respectively, and forward the received multicast packets to the receivers who sent reception requests and are connected thereto by converting destination addresses contained in the received multicast packets according to the conversion tables.

Further, the ISP 900 is disposed so as to be able to receive, from the advertiser 980, a user group definition information 966 that describes the details of users as subjects of advertisement delivery and a user group assignment table 967, and to transmit those to the conversion table update information construction devices 911 and 912 via a network 952 together with user profile information 901 that is provided in the ISP. It is configured so that the multicast packet forwarding devices 921 and 922 can transmit their pieces of user connection information 963 and 964 to the conversion table update information construction devices 911 and 912, respectively.

In this embodiment, the multicast packet forwarding devices 921 and 922 are configured as shown in FIG. 2 as in the case of the first embodiment. Referring to FIG. 2, each of the multicast packet forwarding devices receives a multicast packet, a multicast reception request/unrequest, conversion table update information, etc. via an input port 108 and processes those. Their basic operations are the same as described in the first embodiment.

FIGS. 12A-12C show an example of application of conversion table update information to the conversion table used in each of the multicast packet forwarding devices. In this example, as shown in FIG. 12A, the conversion table 301 consists of inbound address fields, outbound address fields, and connection port ID fields. FIG. 12B shows conversion table update information and FIG. 12C shows an updated conversion table. Detailed update processing will be described later.

(1) Multicast Packet Reception Processing

Figure 11:
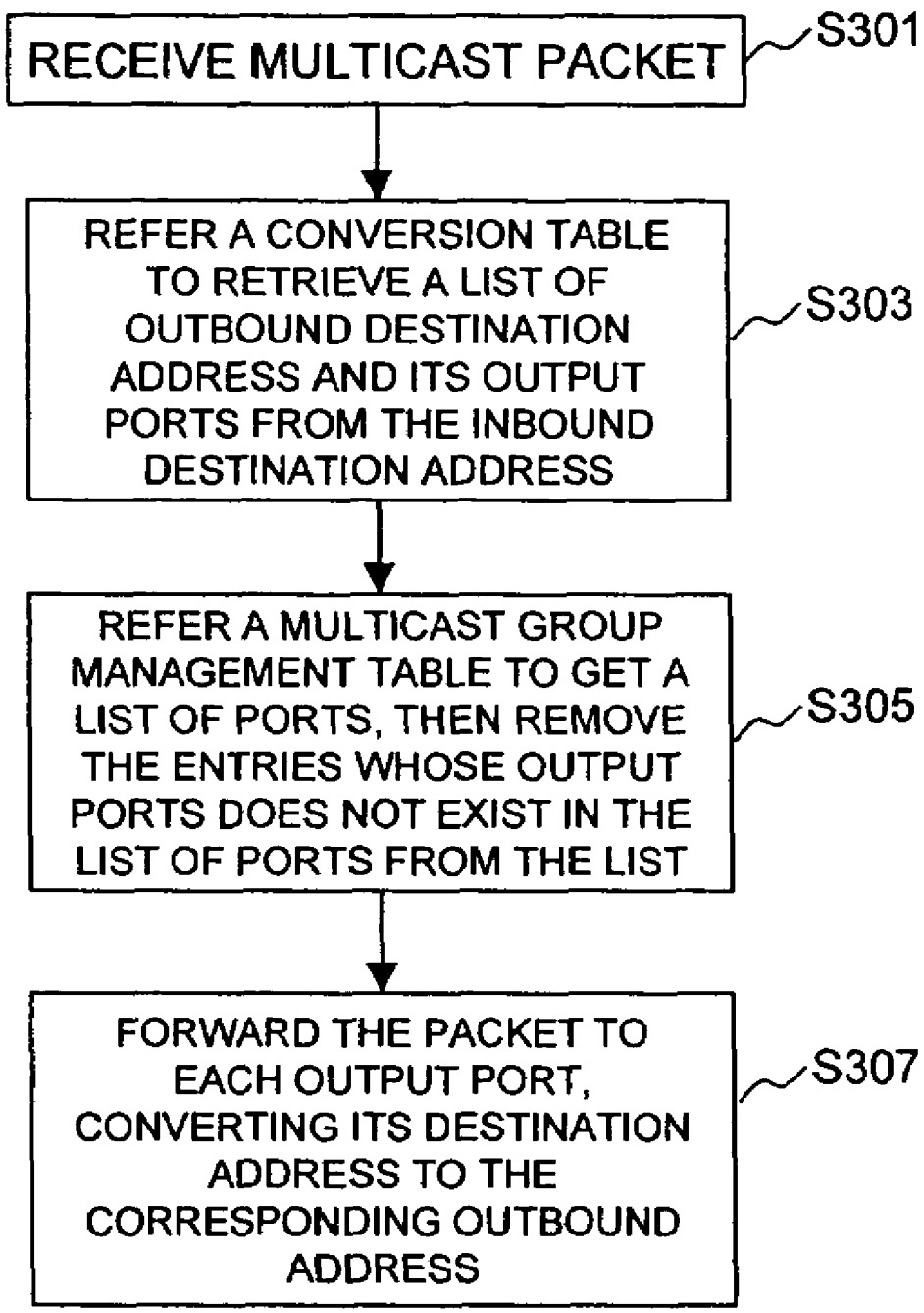
FIG. 11 shows an operation that is performed by the multicast packet forwarding device in receiving a multicast packet.

FIG. 11 shows an operation that is performed by each of the multicast packet forwarding devices in receiving a multicast packet. The operation that is performed in receiving a multicast packet will be described below with reference to FIGS. 2 and 11. At step S301, the routing/switching processing unit 102 of each of the multicast packet forwarding devices 921 and 922 receives a multicast packet from one of the content servers 931, 932, 941, and 942 (i.e., upper node 203) via an input port 108 and the packet forwarding unit 303. At step S303, the multicast packet processing unit 101 searches the inbound address fields of the conversion table 301 for an inbound address that coincides with the destination address of the received multicast packet, and acquires the information of the outbound address field and the port ID field of a coincidence-found entry (i.e., the conversion table is referred to and a list of an outbound destination address and its port IDs are retrieved on the basis of the inbound destination address).

At step S305, the routing/switching processing unit 102 searches the request group address fields of the multicast group management table 302 for an address that coincides with the outbound address of each of the sets of an outbound address and a connection port ID acquired by the multicast packet processing unit 101, and informs the egress NIF 103 of only port IDs in the above list each of which coincides with the port IDs in the packet destination port ID fields of coincidence-found entries (i.e., port IDs each of which does not coincide with any of the forwarding ports acquired by referring to the multicast group management table 302 are eliminated from the list).

At step S307, the egress NIF 103 converts the destination address of the packet to the outbound address that was determined by the multicast packet processing unit 101, and outputs the resulting reception multicast packet to the destination ports that are designated by the routing/switching processing unit 102. Data indicating default processing that should be performed when no match is found with any record may be entered in an inbound address of the conversion table 301, and data indicating that the destination address should be discarded rather than is converted may be entered in an outbound address. This enables a control of discarding a packet that is directed to a certain multicast address or an unregistered multicast address, thereby preventing its forwarding to receivers.

(2) Processing of Receiving a Multicast Reception Request/Unrequest

An operation that is performed when a multicast request/unrequest is received will be described below with reference to FIGS. 2 and 7. The operation that is performed in each of the multicast packet forwarding devices at the time of group entry registration/cancellation is the same as shown in FIG. 7.

At step S201, when the routing/switching processing unit 102 of the multicast packet forwarding unit 921 or 922 receives a multicast reception request/unrequest 304 from one of the receivers 991-994 (i.e., user 202), the multicast group management protocol processing unit 104 updates the multicast group management table 302 by performing an operation prescribed by a multicast group management protocol. For example, in the case of IGMP, when an IGMP membership report is received, the multicast group management protocol processing unit 104 adds, to the multicast group management table 302, an entry corresponding to the request multicast address of a received packet and a reception port, thereby setting a group timer and storing the fact that it is necessary to forward, to the reception port, a packet that is directed to the request multicast address. When a timeout has occurred in the group timer and hence it has become unnecessary to forward, to the port concerned, a packet that is directed to the multicast address concerned, the multicast group management protocol processing unit 104 deletes the entry concerned from the multicast group management table 302.

At step S203, the multicast group management protocol processing unit 104 judges whether it has become necessary to transmit a multicast packet reception request/unrequest to the upper node 203 as a result of the updating of the multicast group management table 302. An example is a change from a state that receivers are connected to the multicast packet forwarding device 921 or 922 to a state that no receivers are connected to it, or vice versa. In this case, at step S205, the conversion table 301 is referred to, an entry of the conversion table 301 having an outbound address field and a connection port ID that coincide with the request multicast address and the reception port ID of the entry concerned is searched for, and the address of the inbound address field of a coincidence-found entry is acquired. The multicast group management protocol processing unit 104 instructs the egress NIF 103 to transmit a reception request/unrequest to the acquired address. However, depending on the form of the network operation, there may occur a case that a plurality of outbound addresses and reception ports correspond to the same inbound address in the conversion table 301. For such a network operation, whether to send a reception request/unrequest to the upper node needs to be judged for each inbound address. Outbound addresses from which a reception request was issued to the upper router are stored for each inbound address. The multicast group management protocol processing unit 104 instructs the egress NIF 103 to transmit a reception request to the upper router if a transition is made from a state that no outbound address exists to a state that at least one outbound address exists, and instructs the egress NIF 103 to transmit a multicast unrequest to the upper router if a transition is made from a state that at least one outbound address exists to a state that no outbound address exists. The egress NIF 103 outputs a specified packet to a certain port of the upper node (S207).

(3) Processing of Receiving Conversion Table Update Information

An operation that is performed when conversion table update information is received will be described below with reference to FIG. 2 and FIGS. 12A-12C.

When the multicast packet forwarding device 921 or 922 receives conversion table update information from the conversion table update information construction device 911 or 912 (201), the conversion table update information processing unit 105 updates the conversion table 301. The conversion table update information 351 is information that is necessary for updating of the conversion table 301. That is, the conversion table update information 351 assumes a table as shown in FIG. 12B that has inbound address fields, outbound address fields, connection port ID fields, and operation fields and indicates differences that will be caused in the conversion table by updating. If the conversion table update information 305 of FIG. 12B is applied to the conversion table 301 of FIG. 12A, the conversion table 301 of FIG. 12C is obtained. In this example, a state that a packet is forwarded to receivers connected to ports P1 and P2 by converting a multicast address E1 to a multicast address M is changed to a state that packets directed to multicast addresses C1 and C2 are forwarded to the receivers connected to ports P1 and P2, respectively, through conversion to the multicast address M. Although content that is received by each receiver is changed because of the updating of the conversion table, each receiver still receives packets having the multicast address M and no processing is performed to handle a reception request, a reception unrequest, or the like. In systems in which authentication needs to be performed at the time of issuance of a reception request, content switching does not require re-authentication.

The conversion table update information construction devices 911 and 912 are devices for transmitting conversion table update information 305 to the multicast packet forwarding devices on the basis of an input from an operator, a content delivery time table, the conversion table update information construction device recited in claim 9 or 10, or the like.

3. Supplements to First and Second Embodiments

In the first and second embodiments, the content delivering servers, the advertisement delivering servers, the multicast packet forwarding devices, and the conversion table update information construction devices are shown as separate devices in FIGS. 1 and 10. However, the invention is not limited to such a configuration. For example, the conversion table update information construction devices may be integrated into the respective multicast packet forwarding devices and one device may serve as a plurality of content delivering servers.

Although the two multicast packet forwarding devices are shown in FIGS. 1 and 10, this does not mean that the invention is limited to the configuration that only two multicast packet forwarding devices exist in a network. Any number of multicast packet forwarding devices can be provided in a network as long as they are located at such positions as to be able to receive packets from the content servers, and the multicast delivery does not lower the scalability.

In the configuration as shown in FIG. 10, either of unicast or multicast can be used in transmitting the user group definition information and the user group assignment table to all the conversion table update information construction devices.

In the first and second embodiments, both of the inbound address and the outbound address are a multicast address. However, they are not limited to an address that is assigned as a multicast address as long as the multicast delivery control apparatus performs similar processing.

Figure 3:
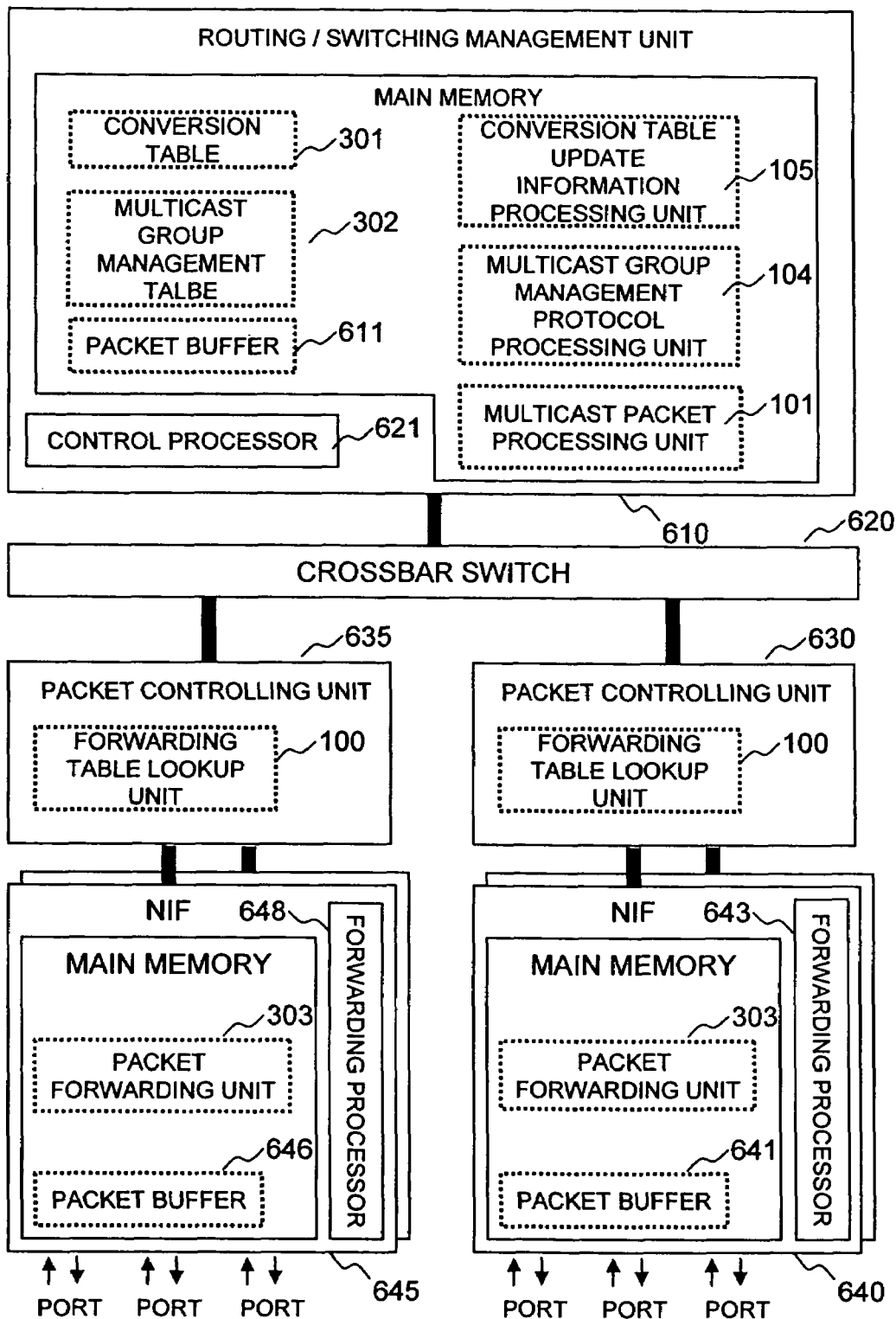
FIG. 3 shows the configuration of a first multicast packet forwarding device.

4. Multicast Packet Forwarding Device (A) First Multicast Packet Forwarding Device FIG. 3 shows the configuration of a first multicast packet forwarding device according to an embodiment of the invention.

In this example, the multicast packet forwarding device is equipped with a routing/switching management unit 610, packet controlling units 630 and 635, network interfaces (NIFs) 640 and 645, and a crossbar switch 620. It is noted that the crossbar switch 620 may be replaced by another, appropriate type of switch. In this example, the routing/switching management unit 610 includes the routing/switching processing unit 102 shown in FIG. 2, a packet buffer 611, and a control processor 621. Each of the packet controlling units 630 and 635 includes the forwarding table lookup unit 100 shown in FIG. 2. Each of the NIFs 640 and 645 includes the input ports 108, the packet forwarding unit 303, and the output ports 109 that are shown in FIG. 2, a packet buffer 641 or 646, and a forwarding processor 643 or 648.

Each of the NIFs 640 and 645 has a plurality of input ports and output ports for connection to external networks. For example, when a packet is received through a port of the NIF 640, the packet forwarding unit 303 copies it to the packet buffer 641 and determines a destination by referring to the forwarding table lookup unit 100 of the packet controlling unit 630 using part of the packet as a search key. The destination of a packet such as ordinary data that is to be subject to only forwarding is a NIF. Such a packet is copied to a destination NIF (e.g., the NIF 645) via the crossbar switch 620, and the packet forwarding unit 303 determines an output port by referring to the forwarding table lookup table 100 and outputs the packet.

When a reception packet is a control packet of a routing protocol or the like, the destination is the routing/switching management unit 610. The packet is copied to the packet buffer 611 via the crossbar switch 620 and is subjected to one or some of various kinds of routing processing etc. depending on the type of the packet. If the packet forwarding rules have been changed as a result of such processing, the table of the forwarding table lookup unit 100 of each of the packet controlling units 630 and 635 is updated.

Figure 8:
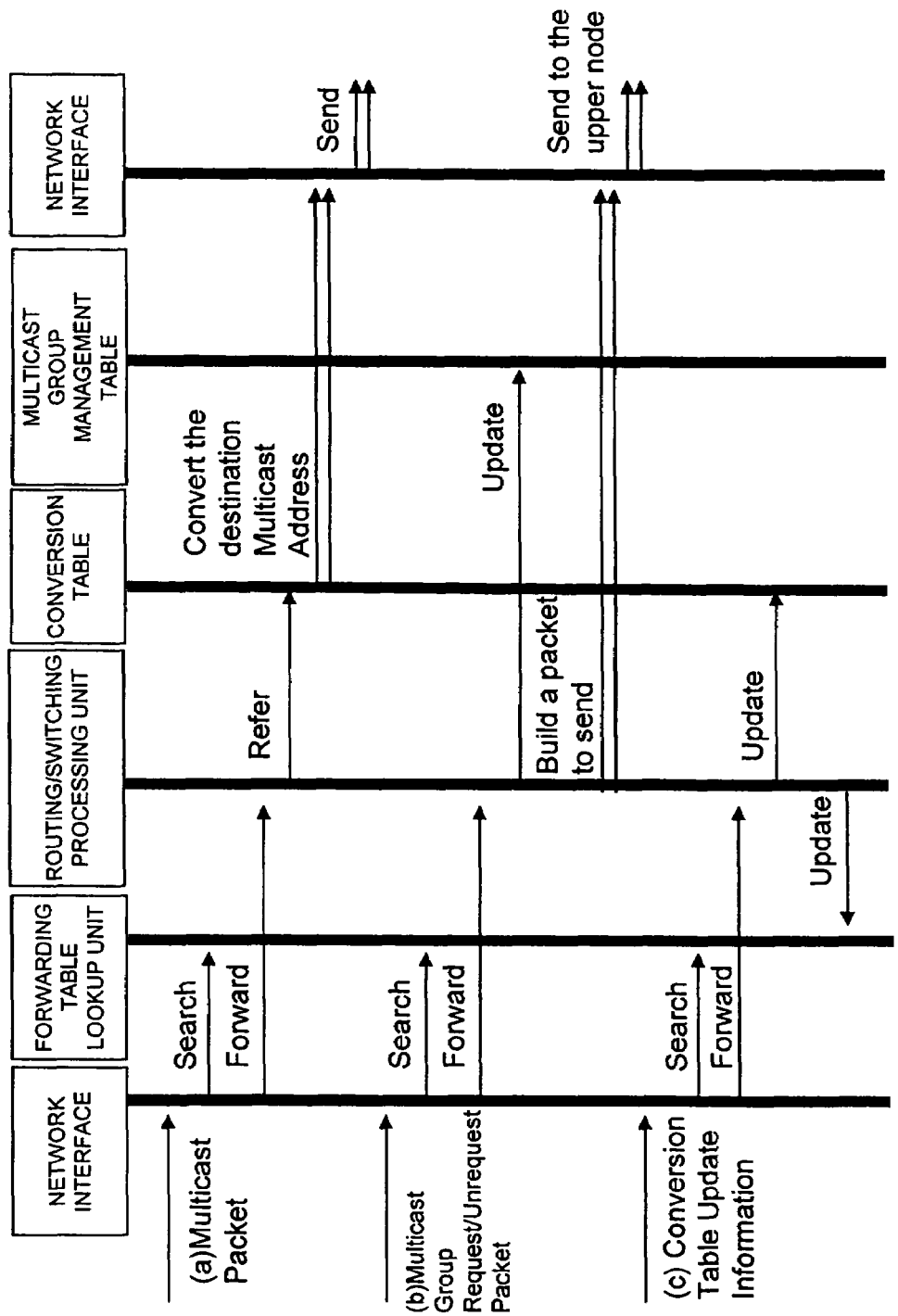
FIG. 8 shows operations of a multicast delivery control device of FIG. 3.

FIG. 8 is a sequence diagram showing operations that are performed when a multicast packet, a multicast group request/unrequest packet, or conversion table update information are received, respectively.

(a) When a multicast packet is received, it is copied to the packet buffer 611 of the routing/switching management unit 610 and the multicast packet processing unit 101 performs the processing described above with reference to FIG. 5 or 11 using the conversion table 301 that is provided in the routing/switching management unit 610.

(b) When a multicast group request/unrequest packet is received, it is copied to the packet buffer 611 of the routing/switching management unit 610 and the multicast group management protocol processing unit 104 performs the processing described above with reference to FIG. 7 using the conversion table 301.

(c) When conversion table update information is received, it is copied to the packet buffer 611 of the routing/switching management unit 610 and the conversion table update information processing unit 105 updates the conversion table 301.

If a packet to transmit exists in each kind of processing, it is copied to the packet buffer 641 or 646 of the NIF via the crossbar switch 620. The packet forwarding unit 303 of the packet-copied NIF transmits the packet in the packet buffer to a designated port.

(B) Second Multicast Packet Forwarding Device

Figure 20:
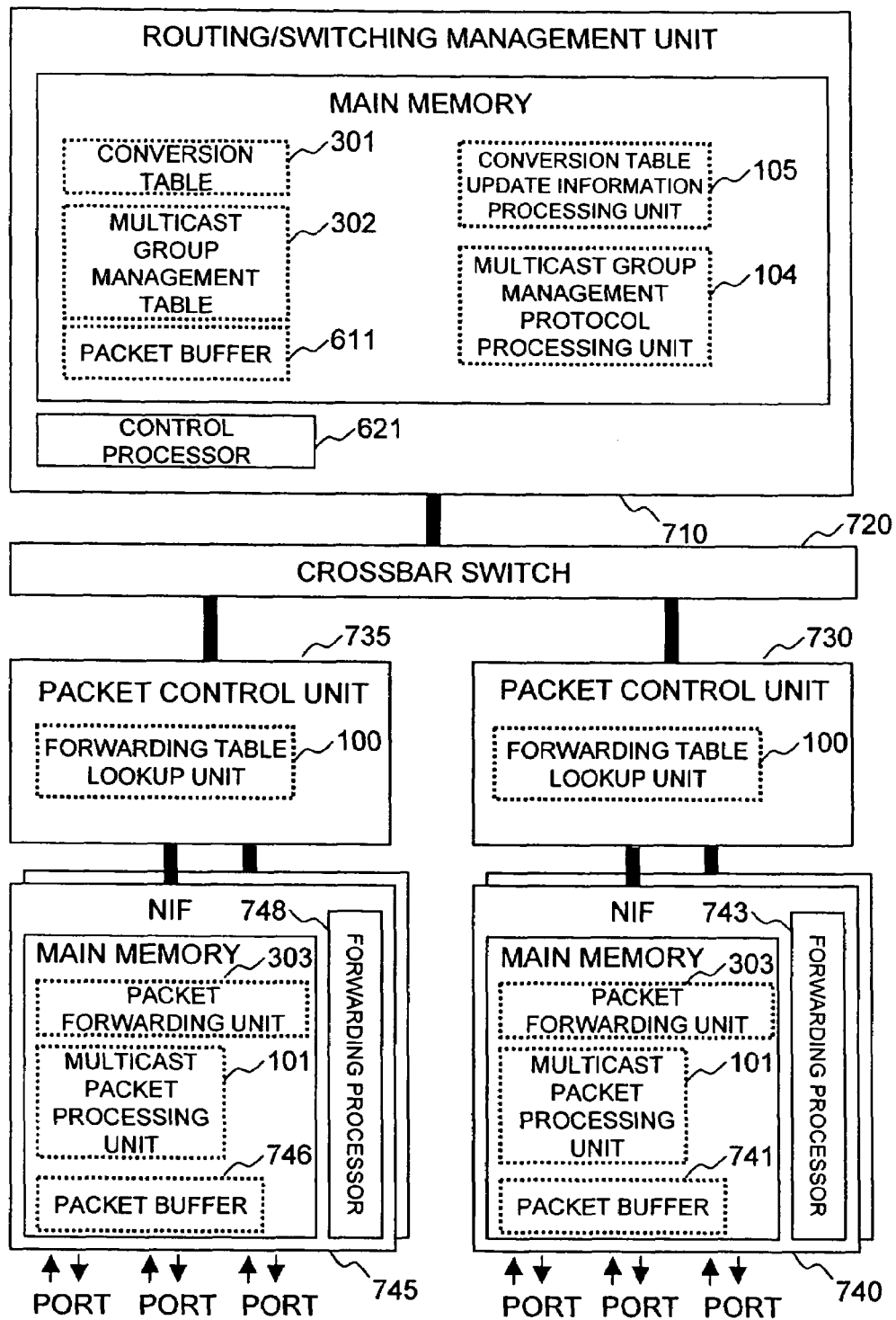
FIG. 20 shows the configuration of a second multicast packet forwarding device.

FIG. 20 shows the configuration of another (i.e., second) multicast packet forwarding device according to one embodiment of the invention. Whereas in the first multicast packet forwarding device the multicast packet processing unit 101 is provided in the routing/switching management unit 610, in the second multicast packet forwarding device the multicast packet processing unit 101 is provided in each of network interfaces (NIFs) 640 and 645.

In this example, the multicast packet forwarding device is equipped with a routing/switching management unit 710, packet controlling units 730 and 735, the NIFs 740 and 745, and a crossbar switch 720. Each of the NIFs 740 and 745 has a plurality of input ports and output ports for connection to external networks. For example, when a packet is received through a port of the NIF 740, the packet forwarding unit 303 copies it to the packet buffer 741 and determines a destination by referring to the forwarding table lookup unit 100 of the packet controlling unit 730 using part of the packet as a search key. The destination of a packet such as ordinary data that is to be subject to only forwarding is a NIF. Such a packet is copied to a destination NIF (e.g., the NIF 745) via the crossbar switch, and the packet forwarding unit 303 determines an output port by referring to the forwarding table lookup table 100 and outputs the packet.

When a reception packet is a control packet of a routing protocol or the like, the destination is the routing/switching management unit 710. The packet is copied to the packet buffer 611 via the crossbar switch 720 and is subjected to one or some of various kinds of routing processing etc. depending on the type of the packet. If the packet forwarding rules have been changed as a result of such processing, the table of the forwarding table lookup unit of each of the packet controlling units is updated.

Figure 21:
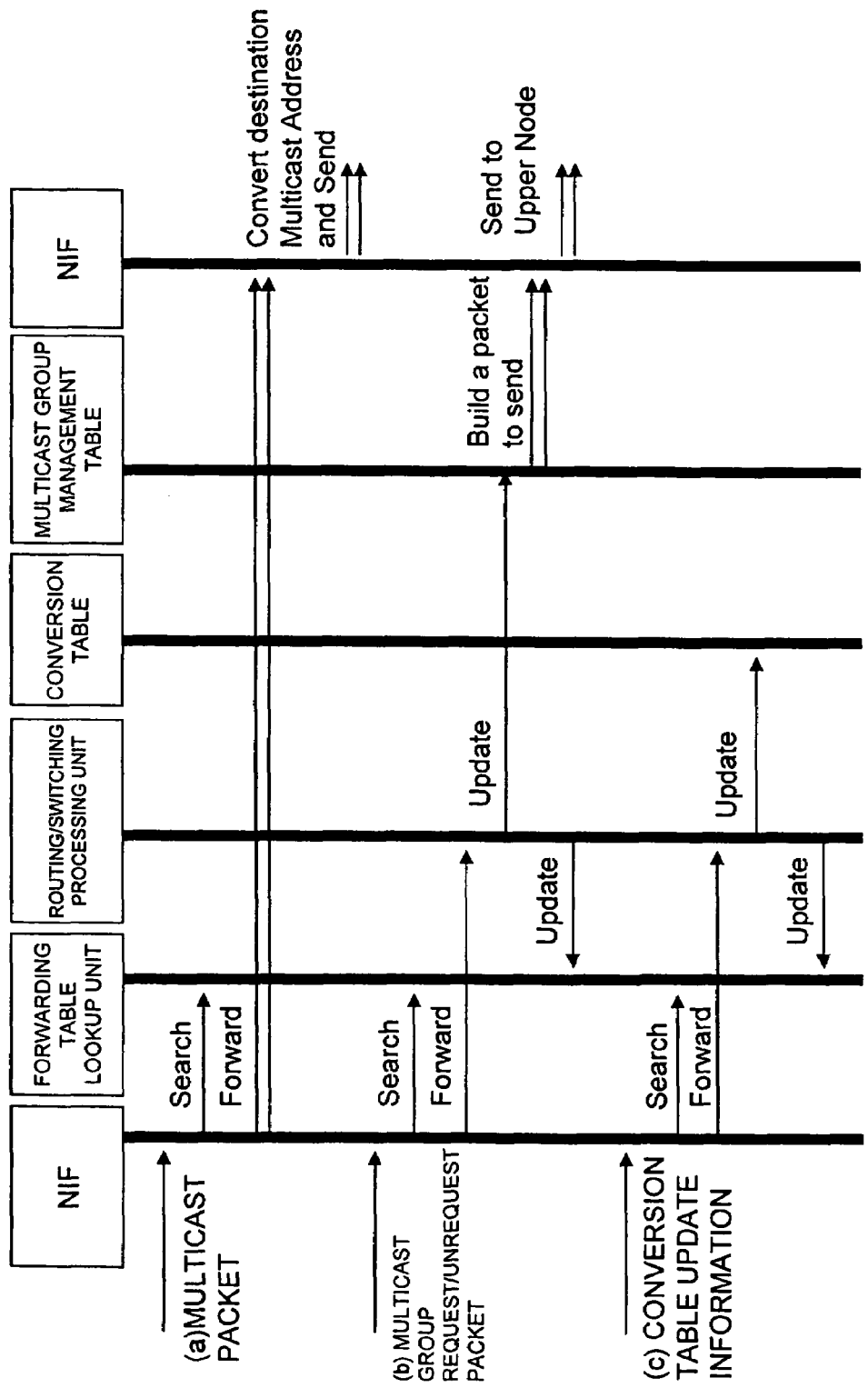
FIG. 21 shows operations of the second multicast packet forwarding device.

FIG. 21 is a sequence diagram showing operations that are performed when a multicast packet, a multicast group request/unrequest packet, and conversion table update information are received, respectively.

(a) When a multicast packet is received, the forwarding table lookup unit 100 of the packet forwarding processing unit determines destination ports and an outbound destination address using the destination address of the received packet and forwards the packet to the NIFs to which the destination ports belong. The packet forwarding unit 303 of each of the destination NIFs 740 and 745 converts the destination address of the packet and outputs the packet to the forwarding port.

(b) When a multicast group request/unrequest packet is received, it is copied to the packet buffer 611 of the routing/switching management unit 710 and the multicast group management protocol processing unit 104 performs the processing described above with reference to FIG. 7 using the conversion table 301.

(c) When conversion table update information is received, it is copied to the packet buffer 611 of the routing/switching management unit 710 and the conversion table update information processing unit 105 updates the conversion table 301.

When the conversion table 301 has been updated, the tables of the forwarding table lookup units 100 are rewritten on the basis of the contents of the updated conversion table 301 to enable transmission of a multicast packet.

If a packet to transmit exists in each kind of processing, it is copied to the packet buffer of the NIF via the crossbar switch 720. The packet forwarding unit of the packet-copied NIF transmits the packet in the packet buffer to a designated port.

Figure 13:
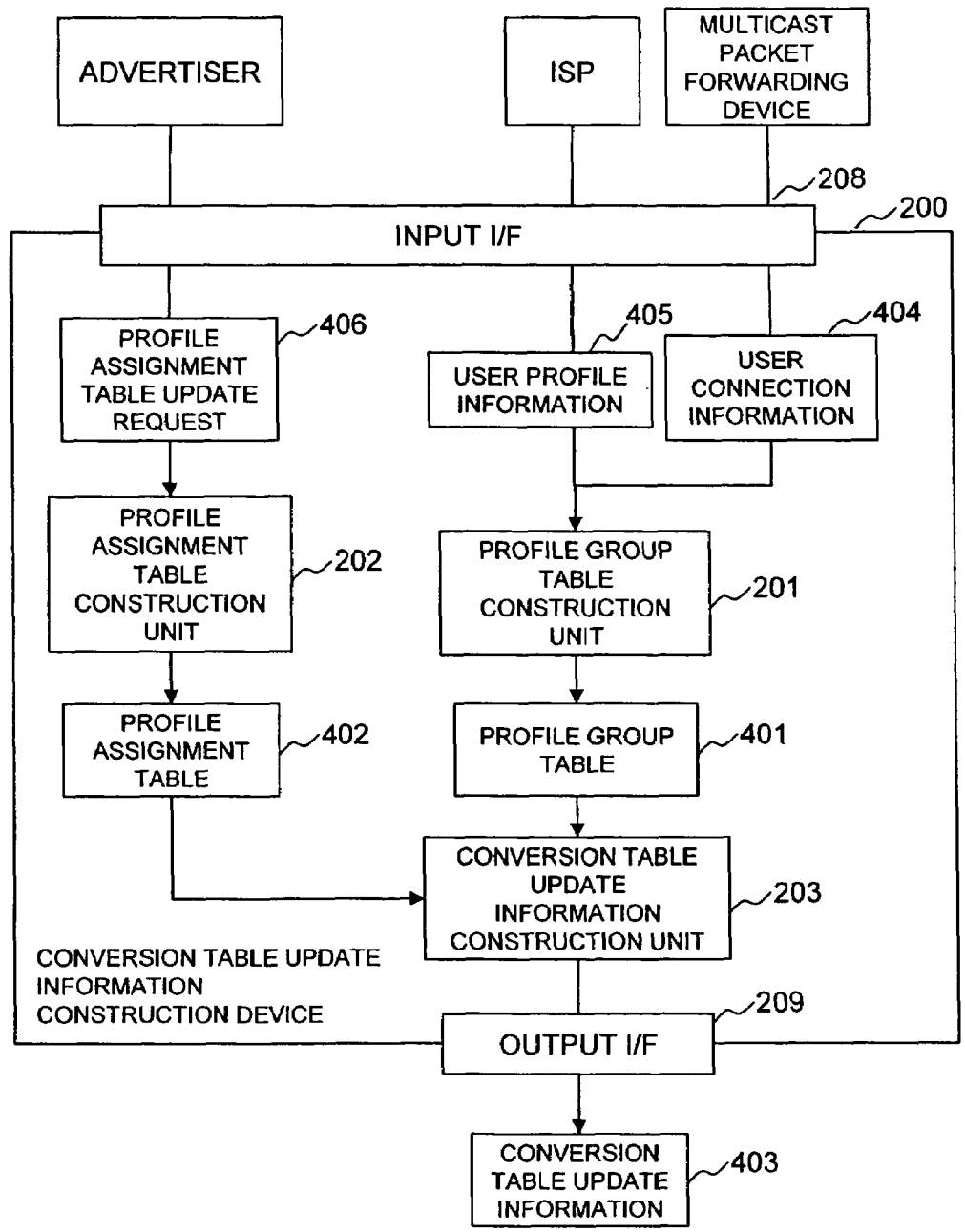
FIG. 13 shows how a first conversion table update information construction device operates.
Figure 15:
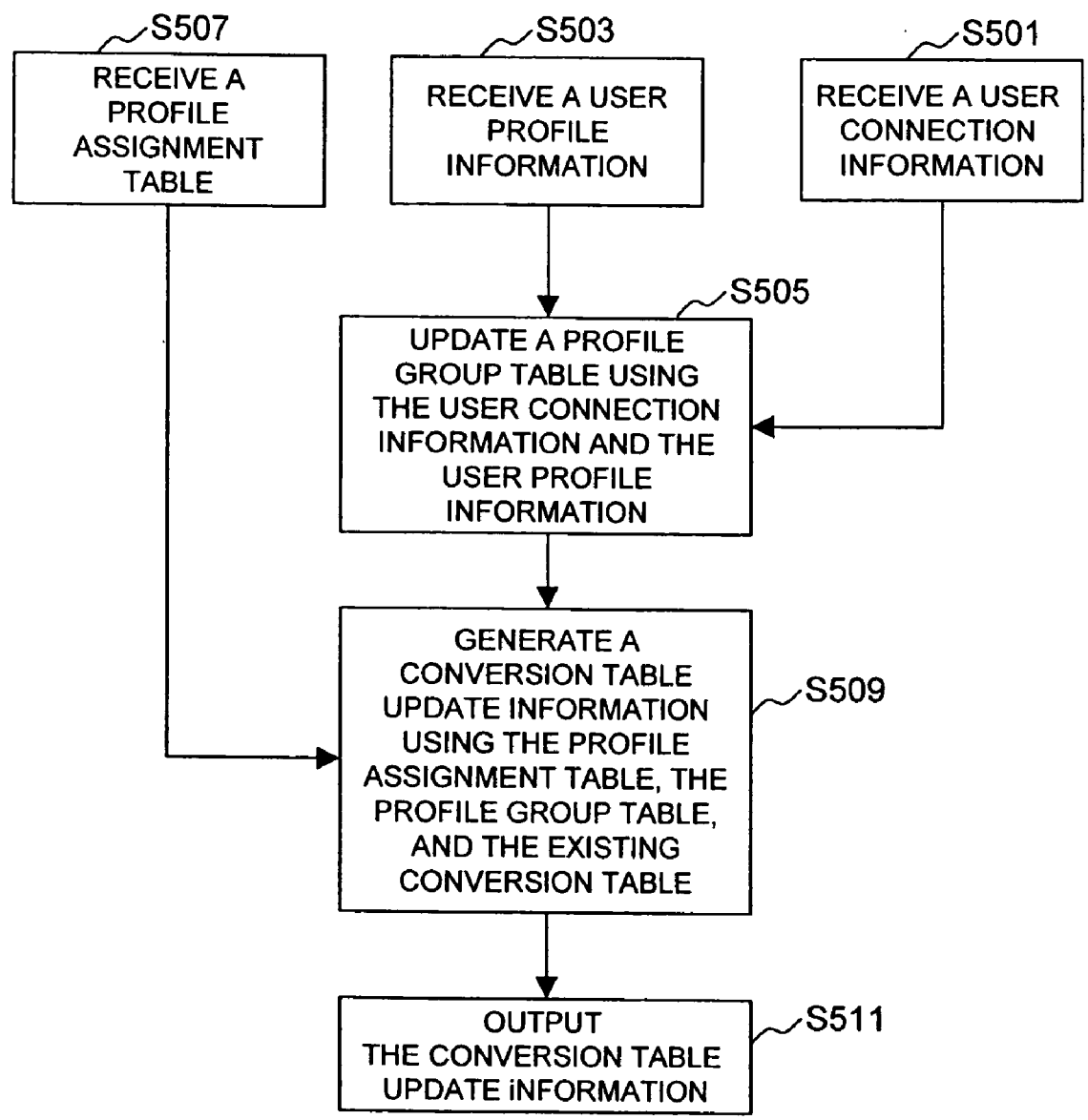
FIG. 15 is a flowchart showing individual steps that are executed by the first conversion table update information construction device.

5. Conversion Table Update Information Construction Device (A) First Conversion Table Update Information Construction Device FIG. 13 shows how a first conversion table update information construction device operates. FIG. 15 is a flowchart showing individual steps that are executed by the first conversion table update information construction device. FIGS. 16A-16E show examples of various kinds of information and a table that are used in the first conversion table update information construction device.

Figure 14:
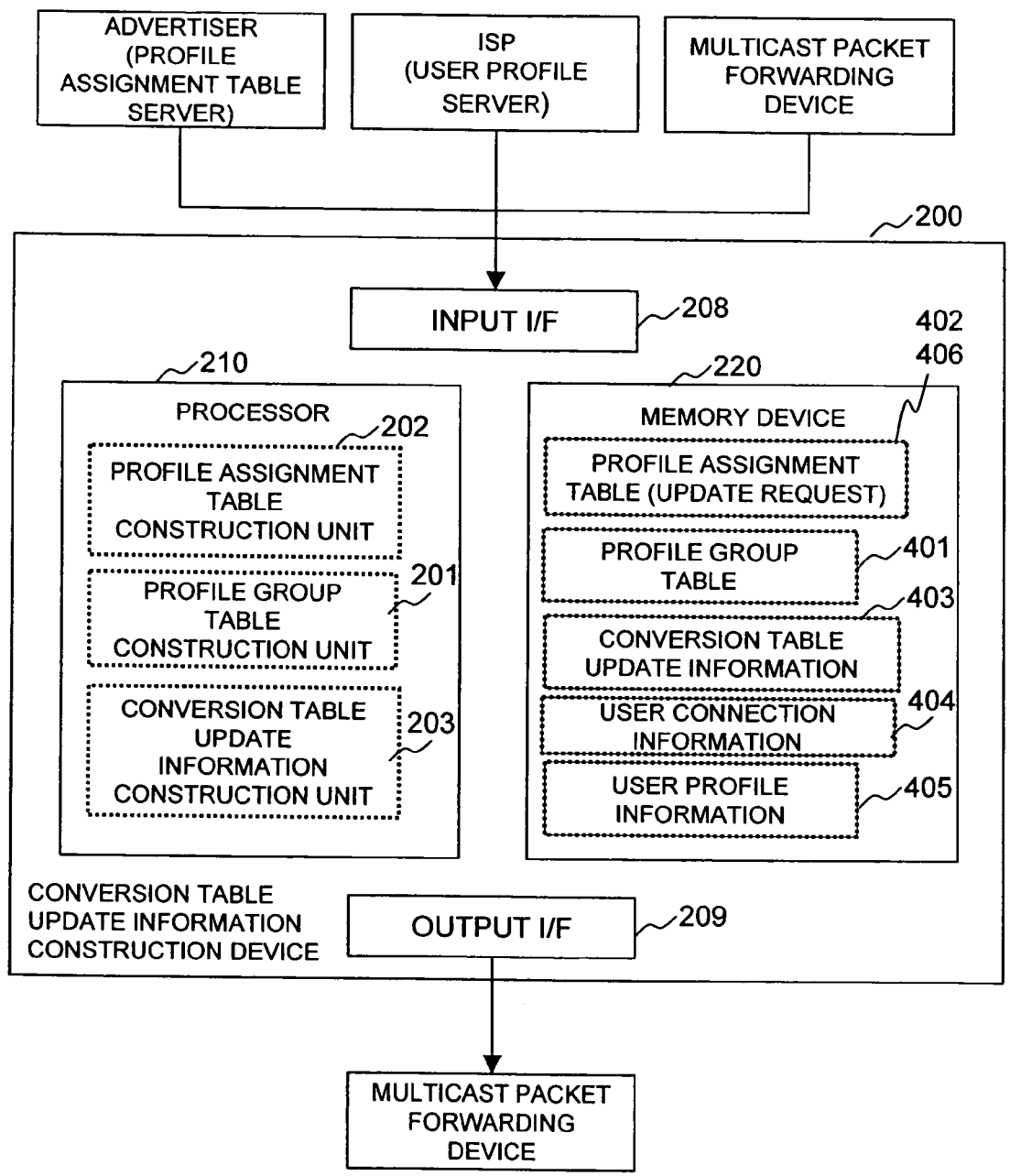
FIG. 14 shows the configuration of the first conversion table update information construction device.

FIG. 14 shows the configuration of the first conversion table update information construction device. As shown in FIG. 14, the first conversion table update information construction device 200 is equipped with an input interface 208, an output interface 209, a processor 210, and a memory device 220. The processor 210 has a profile group information construction unit 201, a profile assignment table construction unit 202, and a conversion table update information construction unit 203. The memory device 220 includes a profile group table 401, a profile assignment table 402 (406), conversion table update information 403, a user connection information table 404, and user profile information 405.

In this example, the conversion table update information construction device 200 has a means for receiving user connection information 404 having a connection port ID field and a user ID field (see FIG. 16A), user profile information 405 having a user ID field and various profile fields (sex, age, etc.) (see FIG. 16B), and a profile assignment table update request 406 (402) having various profile fields (the same as or correspond to those of the user profile information), an inbound address field, and an outbound address field (see FIG. 16D). The conversion table update information construction device 200 constructs conversion table update information 403 having the same format as the conversion table update information 351 shown in FIG. 12B on the basis of those kinds of information, and outputs the constructed conversion table update information 403.

An operation performed by the conversion table update information construction device 200 when it receives information for each table will be described below with reference to FIG. 13 to FIGS. 16A-16E.

When the conversion table update information construction device 200 receives user connection information 404 or user profile information 405 from the provider or the multicast packet forwarding device, the received information is stored in the profile group information construction unit 201 at step S501 or S503. For example, user profile information is generated by the provider when the profile group table needs to be updated, setting is performed before the start of a service, or initial setting is performed. For example, user connection information is generated by the multicast packet controlling device when the connection state of a receiver has changed or a connection has been established. When the user connection information 404 or the user profile information 405 has been changed, at step S505 the profile group table construction unit 201 constructs a new profile group table 401 (see FIG. 16C) having connection port ID fields and various profile fields (the same as those of the user profile information) by combining the user connection information 404 and the user profile information 405, stores the constructed profile group table 401, and hands over the processing to the conversion table update information construction unit (described later).

On the other hand, when a profile assignment table update request 406 is received from the advertiser or the like because it is necessary to update the profile assignment table, the profile assignment table construction unit 202 stores the received profile assignment table update request 406 as the profile assignment table 402 and hands over the processing to the conversion table update information construction unit 203 (described later).

When the profile group table 401 or the profile assignment table 402 has been updated, at step S509 the conversion table update information construction unit 203 constructs conversion table by combining the profile group table 401 and the profile assignment table 402. In this example, differences from the existing conversion table should be transmitted. Therefore, the conversion table update information construction unit 203 determines differences from the stored existing conversion table and thereby constructs, stores, and outputs (step S511) conversion table update information 403 as shown in FIG. 6E.

(B) Second Conversion Table Update Information Construction Device

Figure 17:
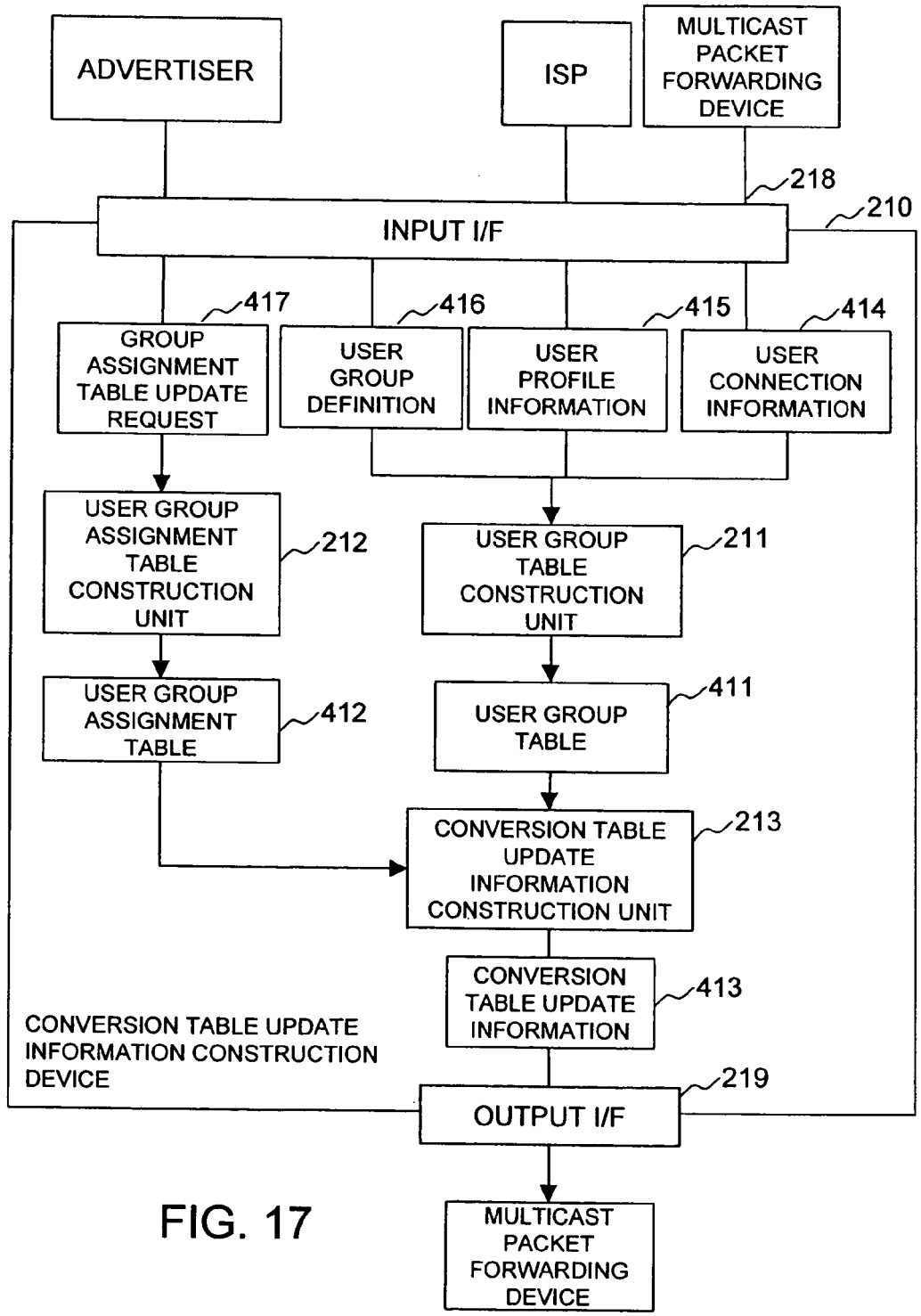
FIG. 17 shows how a second conversion table update information construction device operates.
Figure 18:
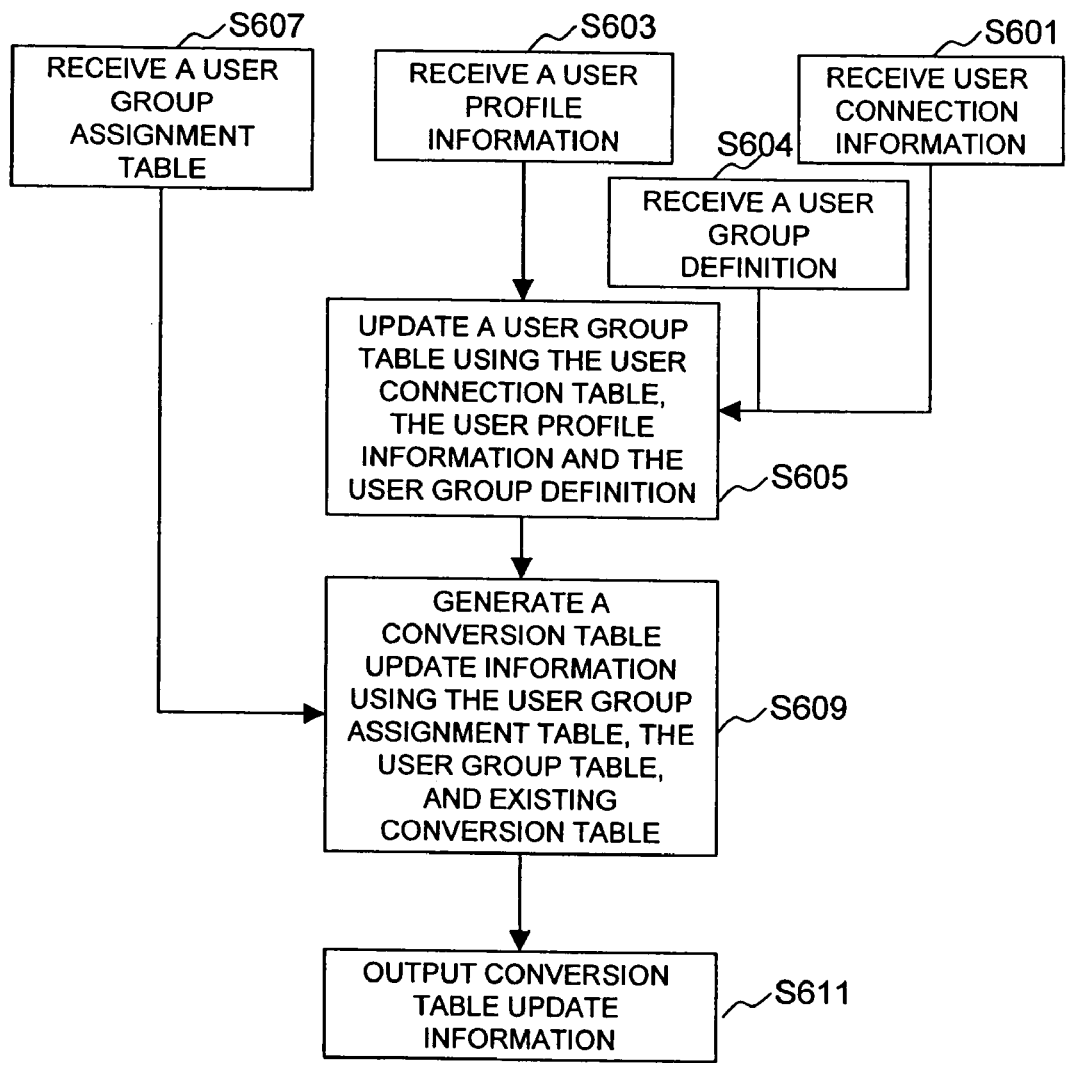
FIG. 18 is a flowchart showing individual steps that are executed by the second conversion table update information construction device.

FIG. 17 shows how a second conversion table update information construction device operates. FIG. 18 is a flowchart showing individual steps that are executed by the second conversion table update information construction device. FIGS. 19A-19F show examples of various kinds of information and a table that are used in the second conversion table update information construction device.

Figure 22:
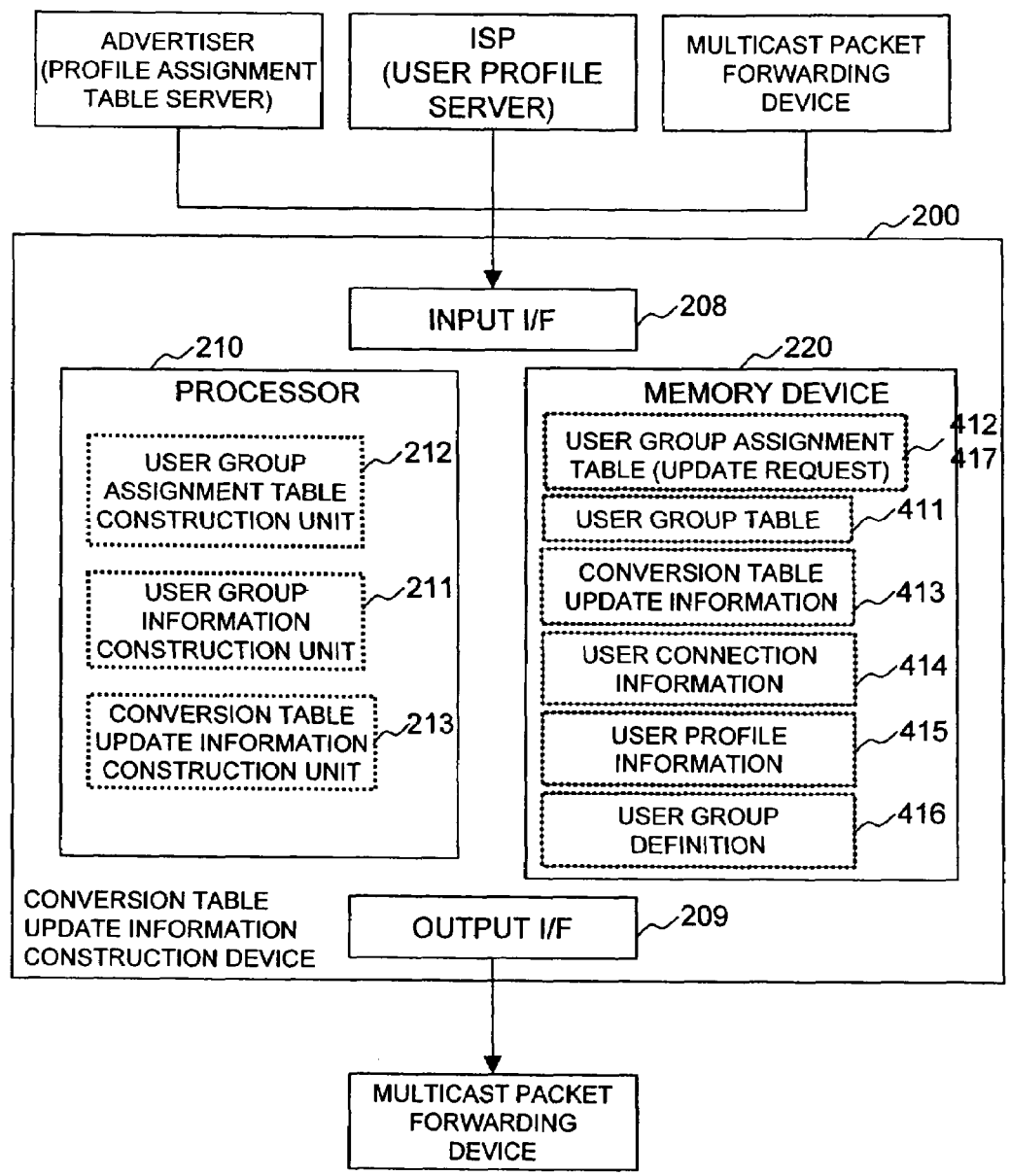
FIG. 22 shows the configuration of the second conversion table update information construction device.

FIG. 22 shows the configuration of the second conversion table update information construction device. As shown in FIG. 22, the second conversion table update information construction device 200 is equipped with an input interface 208, an output interface 209, a processor 210, and a memory device 220. The processor 210 has a user group information construction unit 211, a user group assignment table construction unit 212, and a conversion table update information construction unit 213. The memory device 220 includes a user group table 411, a group assignment table 412 (417), conversion table update information 413, a user connection information table 414, user profile information 415, and a user group definition information 416.

In this example, the conversion table update information construction device 210 has a means for receiving user connection information 414 having a connection port ID field and a user ID field (see FIG. 19C), user profile information 415 having a user ID field and various profile fields (sex, age, hobbies, terminal position information, etc.; in this specific example, sex and age) (see FIG. 19B), a user group definition information 416 having a user group ID field and various profile fields (the same as that of the user profile information) (see FIG. 19C), and a user group assignment table update request 417 having a user group ID, an inbound address field, and an outbound address field (see FIG. 19E). The conversion table update information construction device 200 constructs conversion table update information 413 (see FIG. 19F) having the same format as the conversion table update information 351 shown in FIG. 12B on the basis of those kinds of information, and outputs the constructed conversion table update information 413.

The user connection information 414 can be acquired from authentication data that are used when the multicast packet forwarding device 821 or 822 in establishing connections to receivers. The user profile information 415 is acquired from a database or the like of the provider that enables access to the users. The user group definition 416 describes a definition of a user group for each service and is formed by each advertiser. To allow involvement of a plurality of advertisers, it is necessary to avoid duplication of user group IDs. The group assignment table update request 417 indicates content of what inbound address should be transmitted to the users belonging to the group having each user group ID.

An operation performed by the conversion table update information construction device 200 when it receives each kind of information will be described below. When the conversion table update information construction device 200 receives user connection information 414, user profile information 415, or a user group definition 416 from the provider or the multicast packet forwarding device, the received information is stored in the user group information construction unit 211 at step S601, S603, or S604. When the user connection information 414, the user profile information 415, or the user group definition 416 has been changed, at step S605 the user group information construction unit 211 constructs a new user group table 411 (see FIG. 19D) having connection port ID fields and user group ID fields (the same as those of the user group definition) by combining the user connection information 414 and the user profile information 415, and the user group definition 416, stores the constructed user group table 411, and hands over the processing to the conversion table update information construction unit (described later).

On the other hand, when a user group assignment table update request 417 is received from the advertiser or the like, at step S607 the user group assignment table construction unit 212 stores the received user group assignment table update request 417 as the user group assignment table 412 and hands over the processing to the conversion table update information construction unit 213 (described later).

When the user group table 411 or the user group assignment table 412 has been updated, at step S609 the conversion table update information construction unit 213 constructs conversion table by combining the user group table 411 and the user group assignment table 412. In this example, differences from the existing conversion table 301 should be transmitted. Therefore, the conversion table update information construction unit 213 determines differences from the stored existing conversion table and thereby constructs, stores, and outputs (step S611) conversion table update information 413 as shown in FIG. 19F.

The user group table 411 of FIG. 19D corresponds to a case that each port receives only one service, and hence a maximum of one user group ID corresponds to each port. Where a user receives a plurality of services by sending reception requests to a plurality of outbound addresses, the user group table should have a plurality of user IDs for each port. Even if such a user group table is combined with a group assignment table update request, two inbound addresses come to correspond to different outbound addresses, respectively, for the same port and hence delivery can be performed without causing any problems.

6. Supplements to Conversion Table Update Information Construction Device

In the configurations of FIGS. 1 and 10, in the case where a plurality of content delivery services are provided and outbound addresses M1 and M2, for example, are used, there may occur a case of delivering the same content such as a special announcement to a plurality of outbound addresses. In this case, since a plurality of outbound addresses correspond to a single inbound address, the same packet is transmitted twice to a receiver who sent reception requests to both addresses M1 and M2 by converting an inbound address of the same packet to the addresses M1 and M2.

The above-described profile assignment table update request 406 and group assignment table update request 417 should be received by the conversion table update information construction device with timing that is desired by the service provider. Therefore, the requests 406 and 417 may contain reception timing information (e.g., timing specifying information such as a delivery date, day of the week, and time). In this case, the conversion table update information construction device should be equipped with a mechanism that operate according to the timing information. Further, the sender of the above timing information may be different from the party who sets the profile assignment table update request 406 and group assignment table update request 417. An exemplary case is such that a content provider provides commercial message interval information (time etc.) together with content in the form of meta-information in the content and the provider delivers the content in such a manner as to insert advertisements from advertisers in those intervals.

7. Third Embodiment of Multicast Delivery Control Apparatus and Method

FIG. 10 also shows a multicast network to which a multicast delivery control apparatus and method according to a third embodiment of the invention are applied. The multicast delivery control apparatus is equipped with multicast packet forwarding devices 921 and 922 or the multicast packet forwarding devices 921 and 922 and conversion table update information construction devices 911 and 912.

In this example, an Internet service provider (ISP) 900 receives advertisements 981 and 982 from an advertiser 980 and delivers those to receivers using content servers (advertisement delivering servers) 931 and 932. Further, the Internet service provider 900 purchases pieces of content 971 and 972 from content providers 970 and 975 and delivers those to receivers using content servers (content delivering servers) 941 and 942.

As shown in FIG. 10, the content servers 931, 932, 941, and 942 and the multicast packet forwarding devices 921 and 922 are connected to a multicast network 951. Receivers 991 and 992 and the conversion table update information construction device 911 are connected to the multicast packet forwarding device 921, and receivers 993 and 994 and the conversion table update information construction device 912 are connected to the multicast packet forwarding device 922. The combinations of a source address and a multicast address of a multicast packet that is transmitted from the content servers 931, 932, 941, and 942 to the multicast network 951 are (S1, G1), (S2, G1), (S3, G2), and (S4, G2). These source addresses and multicast addresses will be described later. The multicast network 951 transmits multicast packets to the multicast packet forwarding devices 921 and 922 that sent reception requests. The multicast packet forwarding devices 921 and 922 update internal conversion tables on the basis of pieces of conversion table update information 961 and 962 supplied from the conversion table update information construction devices 911 and 912, respectively, and forward the received multicast packets to the receivers who sent reception requests and are connected thereto by converting source addresses and/or destination addresses contained in the received multicast packets according to the conversion tables.

Further, the ISP 900 is disposed so as to be able to receive, from the advertiser 980, a user group definition information 966 that describes the details of users as subjects of advertisement delivery and a user group assignment table 967, and to transmit those to the conversion table update information construction devices 911 and 912 via a network 952 together with user profile information 901 that is provided in the ISP. The ISP 900 is configured so that the multicast packet forwarding devices 921 and 922 can transmit their pieces of user connection information 963 and 964 to the conversion table update information construction devices 911 and 912, respectively.

In this embodiment, the multicast packet forwarding devices 921 and 922 are configured as shown in FIG. 2 as in the case of the first and second embodiments. Referring to FIG. 2, each of the multicast packet forwarding devices receives a multicast packet, a multicast reception request/unrequest, and conversion table update information via an input port 108 and processes those. Their basic operations are the same as described in the first embodiment.

FIGS. 23A-23C show an example of application of conversion table update information to the conversion table 301 used in each of the multicast packet forwarding devices. In this example, as shown in FIG. 23A, the conversion table 301 consists of source address fields and destination address fields of an inbound flow, source address fields and destination address fields of an outbound flow, and connection port ID fields.

Inbound flow source addresses are addresses of the content servers 931, 932, 941, and 942 themselves that are used by the servers for content delivery. Inbound flow destination address fields are destination multicast addresses that are used by the content servers 931, 932, 941, and 942 for content delivery. Outbound flow source address field and destination address field are source addresses and multicast addresses, respectively, that are used for reception requests that are output from the receivers to receive multicast packets transmitted from the content servers 931, 932, 941, and 942. The outbound flow source addresses and destination addresses are used as source addresses and destination addresses of received packets of the inbound flow when the multicast packet forwarding devices 921 and 922 forward those packets to the receivers.

FIG. 23B shows conversion table update information and FIG. 23C shows an updated conversion table. Detailed update processing will be described later.

FIG. 27 shows an example of the multicast group management table. A set of a source address and a destination address of a request flow identifier (outbound flow) and destination port IDs are stored in the multicast group management table 302 so as to be correlated with each other.

(1) Multicast Packet Reception Processing

Figure 24:
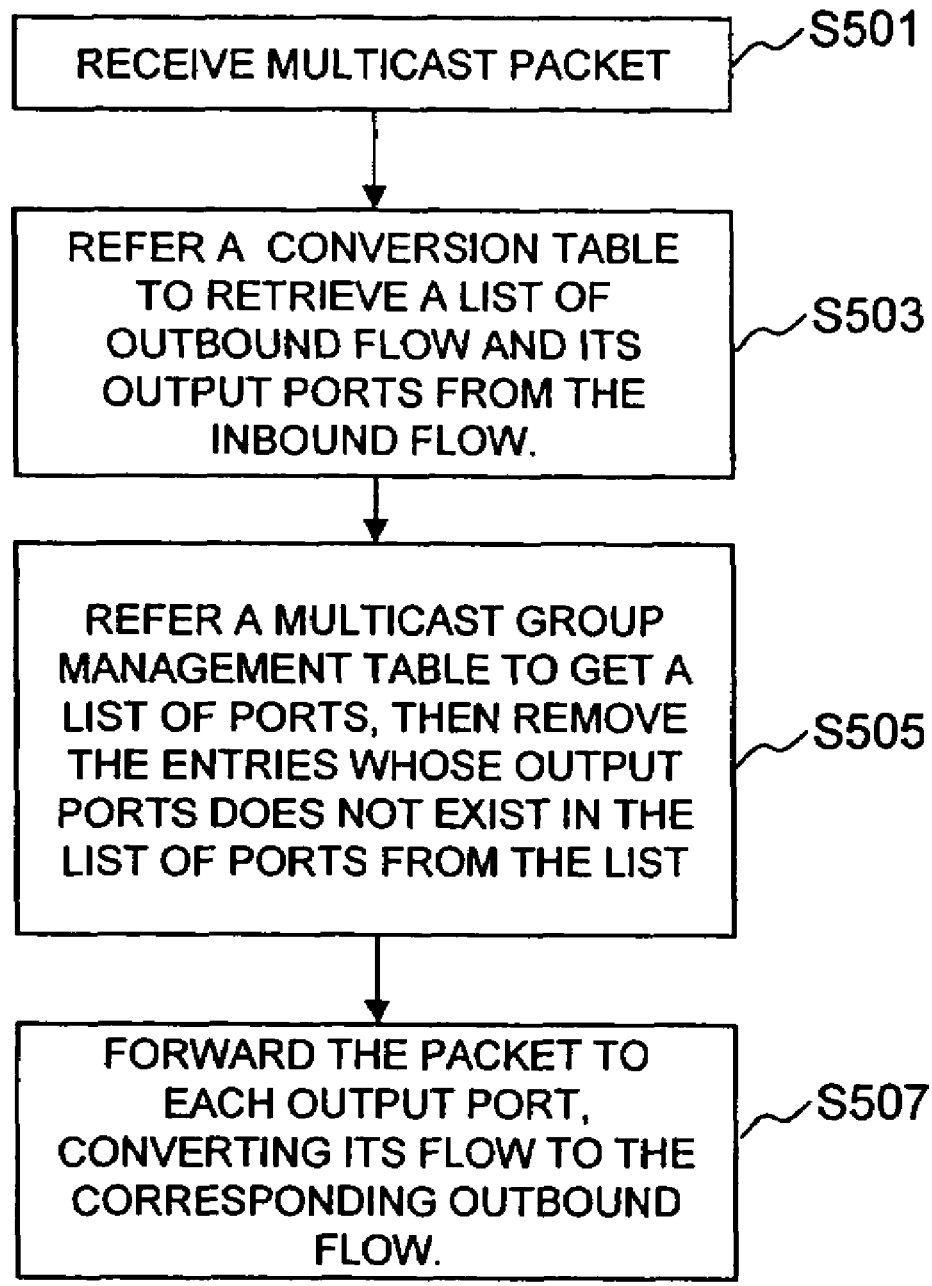
FIG. 24 shows an operation that is performed by the multicast packet forwarding device in receiving a multicast packet.

FIG. 24 shows an operation that is performed by each of the multicast packet forwarding devices in receiving a multicast packet. The operation that is performed in receiving a multicast packet will be described below with reference to FIGS. 2 and 24. At step S501, the routing/switching processing unit 102 of each of the multicast packet forwarding devices 921 and 922 receives a multicast packet from one of the content servers 931, 932, 941, and 942 (i.e., upper node 203) via an input port 108 and the packet forwarding unit 303. At step S503, the multicast packet processing unit 101 searches the inbound flow source address fields and destination address fields of the conversion table 301 for addresses that coincide with the source address and destination address of the received multicast packet, and acquires the information of the outbound flow (source address and destination address) and the connection port ID of a coincidence-found entry (i.e., the conversion table is referred to and a list of an outbound flow and its forward port IDs are retrieved on the basis of the flow of the multicast packet).

At step S505, the routing/switching processing unit 102 searches the request group address fields of the multicast group management table 302 (see FIG. 27) for an address that coincides with the outbound flow destination address of each of the sets of an outbound flow (source address and destination address) and a connection port ID acquired by the multicast packet processing unit 101, and informs the egress NIF 103 of only port IDs in the above list each of which coincides with the connection port IDs (destination port IDs) in the destination packet destination port ID fields of coincidence-found entries (i.e., port IDs each of which does not coincide with any of the forward ports acquired by referring to the multicast group management table are eliminated from the list).

At step S507, the egress NIF 103 converts the source address and the destination address of the packet to the outbound flow (source address and destination address) that was determined by the multicast packet processing unit 101, and outputs the resulting multicast packet to the destination ports that are designated by the routing/switching processing unit 102.

Data indicating default processing that should be performed when no match is found with any record may be entered in an inbound flow of the conversion table 301, and data indicating that the inbound flow should be discarded rather than is converted may be entered in an outbound flow. This enables a control of discarding a multicast packet having a certain multicast address or an unregistered flow, thereby preventing its forwarding to receivers.

(2) Processing of Receiving a Multicast Reception Request/Unrequest

Figure 25:
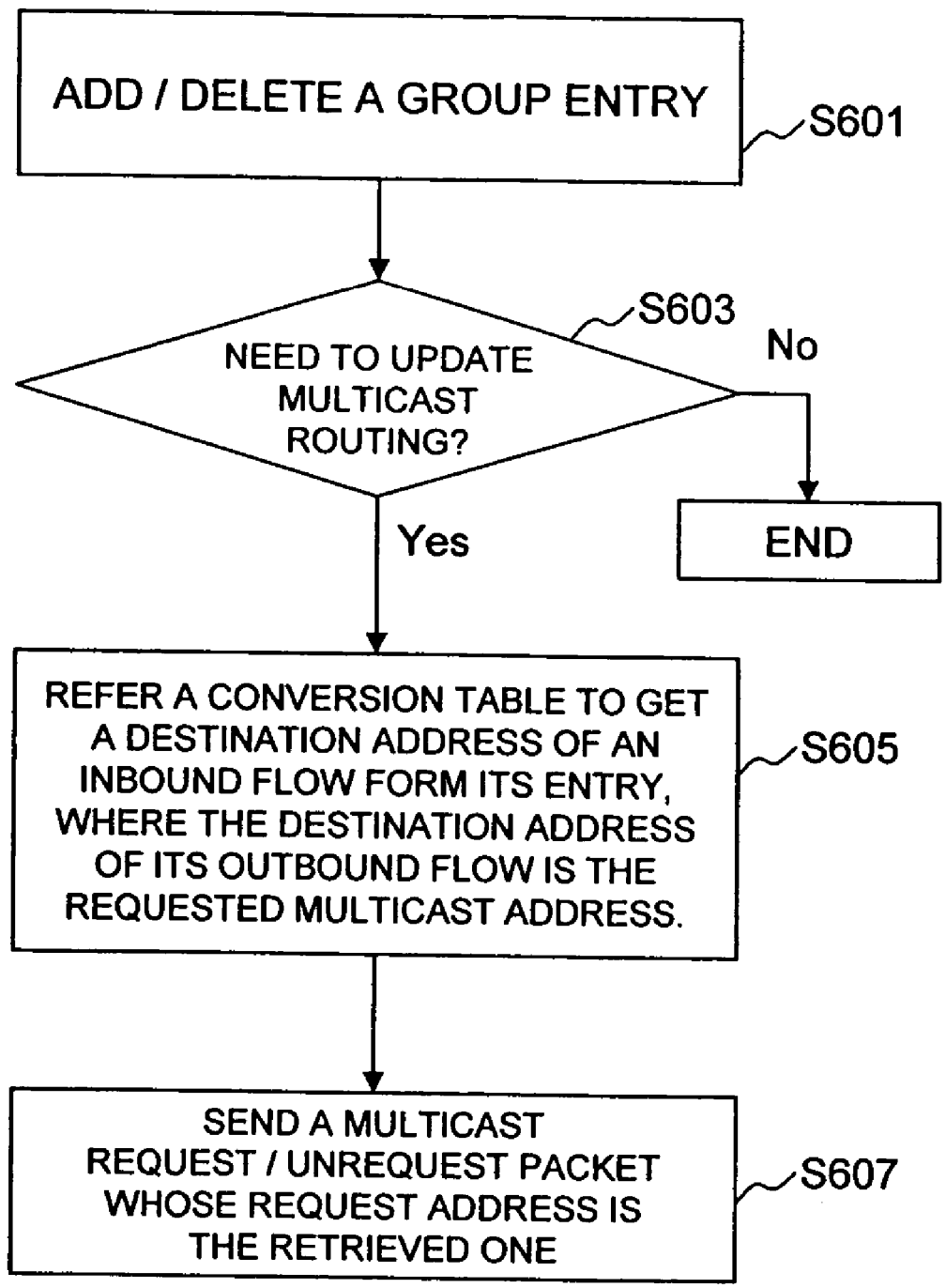
FIG. 25 shows an operation that is performed by the multicast packet forwarding device at the time of group entry registration/cancellation.

An operation that is performed when a multicast reception request/unrequest is received will be described below with reference to FIGS. 2 and 25. The operation that is performed in each of the multicast packet forwarding devices at the time of group entry registration/cancellation is the same as shown in FIG. 25.

At step S601, when the routing/switching processing unit 102 of the multicast packet forwarding unit 921 or 922 receives a multicast reception request/unrequest 304 from one of the receivers 991-994 (i.e., user 202), the multicast group management protocol processing unit 104 updates the multicast group management table 302 by performing an operation prescribed by a multicast group management protocol. For example, in the case of IGMP, when an IGMP membership report is received, the multicast group management protocol processing unit 104 adds, to the multicast group management table 302, an entry corresponding to the request multicast address of a received packet and a reception port, thereby setting a group timer and storing the fact that it is necessary to forward, to the reception port, a packet that is directed to the request multicast address. When a timeout has occurred in the group timer and hence it has become unnecessary to forward, to the port concerned, a packet that is directed to the multicast address concerned, the multicast group management protocol processing unit 104 deletes the entry concerned from the multicast group management table 302.

At step S603, the multicast group management protocol processing unit 104 judges whether it has become necessary to transmit a multicast packet reception request/unrequest to the upper node 203 as a result of the updating of the multicast group management table 302. An example is a change from a state that receivers are connected to the multicast packet forwarding device 921 or 922 to a state that no receivers are connected to it, or vice versa. In this case, at step S605, the conversion table 301 is referred to, an entry of the conversion table 301 having an outbound flow destination address field and a connection port ID that coincide with the request multicast address and the reception port ID of the entry concerned is searched for, and the inbound flow destination address field of a coincidence-found entry is acquired. At step S607, the multicast group management protocol processing unit 104 instructs the egress NIF 103 to transmit a reception request/unrequest to the acquired address. However, depending on the form of the network operation, there may occur a case that a plurality of outbound addresses and reception ports correspond to the same inbound address in the conversion table 301. For such a network operation, whether to send a reception request/unrequest to the upper node needs to be judged for each inbound address. Outbound addresses from which a reception request was issued to the upper router are stored for each inbound address. The multicast group management protocol processing unit 104 instructs the egress NIF 103 to transmit a reception request to the upper router if a transition is made from a state that no outbound address exists to a state that at least one outbound address exists, and instructs the egress NIF 103 to transmit a reception unrequest to the upper router if a transition is made from a state that at least one outbound address exists to a state that no outbound address exists. The egress NIF 103 outputs a specified packet to a certain port of the upper node.

(3) Processing of Receiving Conversion Table Update Information

An operation that is performed when conversion table update information 305 is received will be described below with reference to FIG. 2 and FIGS. 23A-23C.

When the multicast packet forwarding device 921 or 922 receives conversion table update information from the conversion table update information construction device 911 or 912 (201), the conversion table update information processing unit 105 updates the conversion table 301. The conversion table update information 305 is information that is necessary for updating of the conversion table 301. That is, the conversion table update information assumes a table as shown in FIG. 23B that has inbound flow source address fields and destination address fields, outbound flow source address fields and destination address fields, connection port ID fields, and operation fields and indicates differences that will be caused in the conversion table by updating. If the conversion table update information 305 of FIG. 23B is applied to the conversion table 301 of FIG. 23A, the conversion table 301 of FIG. 23C is obtained. In this example, before the updating, a packet is forwarded to the receiver connected to a port P1 by converting an inbound flow (S1, G1) to an outbound flow (S, G) and a packet is forwarded to the receiver connected to a port P2 by converting an inbound flow (S2, G1) to an outbound flow (S, G). After the updating, a packet is forwarded to the receiver connected to a port P1 by converting an inbound flow (S3, G1) to an outbound flow (S, G), a packet is forwarded to the receiver connected to a port P2 by converting an inbound flow (S4, G2) to an outbound flow (S, G), and inbound flows (S1, G1) and (S2, G2) are discarded. Although content that is received by each receiver is changed because of the updating of the conversion table, each receiver still receives packets having the multicast address G and no processing is performed to handle a reception request, a reception unrequest, or the like. In systems in which authentication needs to be performed at the time of issuance of a reception request, content switching does not require re-authentication.

The conversion table update information construction devices 911 and 912 are devices for transmitting conversion table update information 305 to the multicast packet forwarding devices on the basis of an input from an operator, a content delivery time table, the conversion table update information construction device recited in claim 9 or 10, or the like.

8. Supplements to Third Embodiment

In the third embodiment, the content delivering servers 941 and 942, the advertisement delivering servers 931 and 932, the multicast packet forwarding devices 921 and 922, and the conversion table update information construction devices 911 and 912 are shown as separate devices in FIG. 10. However, the invention is not limited to such a configuration. For example, the conversion table update information construction devices 911 and 912 maybe integrated into the respective multicast packet forwarding devices 921 and 922 and one device may serve as the plurality of content delivering servers 941 and 942.

Although the two multicast packet forwarding devices 921 and 922 are shown in FIG. 10, this does not mean that the invention is limited to the configuration that only two multicast packet forwarding devices exist in a network. Any number of multicast packet forwarding devices can be provided in a network as long as they are located at such positions as to be able to receive packets from the content delivering servers 931, 932, 941, and 942, and the multicast delivery does not lower the scalability.

In the configuration as shown in FIG. 10, either of unicast and multicast can be used in transmitting the user group definition information 966 and the user group assignment table (update request) 967 to all the conversion table update information construction devices 911 and 912.

In the third embodiment, both of the inbound address and the outbound address are a multicast address. However, they are not limited to an address that is assigned as a multicast address as long as the multicast delivery control apparatus performs similar processing.

Although the conversion table shown in FIGS. 23A-23C is used in the third embodiment, the fields that constitute the conversion table may be modified depending on the properties and operation policies of the multicast network and the receiving terminals.

FIGS. 26A-26C show modifications of the conversion table.

The modification of the conversion table shown in FIG. 26A corresponds to a case that a source address is not converted. Where the receiving terminals do not identify a flow using a source address, it is not necessary to convert a source address and hence only a multicast address is converted.

The modification of the conversion table shown in FIG. 26B corresponds to a case that a multicast address is not converted. Where the multicast network used for transmission forms a delivery tree for each source address and all the transmission terminals transmit content using the same multicast address, it is not necessary to convert the multicast address and hence only a source address is converted.

The modification of the conversion table shown in FIG. 26C corresponds to a case that the receiving terminals do not identify a flow using a source address, the multicast network used for transmission forms a delivery tree for each source address, and all the transmission terminals transmit content using the same multicast address. In this case, the multicast packet forwarding device does not perform address conversion on a packet and outputs a packet to only ports that are correlated with a flow that is determined by a source address and an inbound multicast address.

FIGS. 28A-28C show examples of the multicast group management table corresponding to the modifications of the conversion table shown in FIGS. 26A-26C, respectively. The multicast group management table may be omitted.

As described in the third embodiment and the above modifications, the combinations of the fields constituting the inbound flow identifier and the outbound flow identifier are as follows:

1) Inbound flow identifier: source address and destination multicast address

Outbound flow identifier: source address and destination multicast address

2) Inbound flow identifier: source address and destination multicast address

Outbound flow identifier: source address

3) Inbound flow identifier: source address and destination multicast address

Outbound flow identifier: destination multicast address

4) Inbound flow identifier: source address and destination multicast address

Outbound flow identifier: none

Each processing can be performed in the same manner as described in the section "7. Third Embodiment of Multicast Delivery Control Apparatus and Method" by using the above-described modifications of the conversion table and the multicast group management table.

In the sections "4. Multicast Packet Forwarding Device," "5. Conversion Table Update Information Construction Device," and "6. Supplements to Conversion Table Update Information Construction Device, " the inbound address field and the outbound address field of the conversion table and each of the tables for constructing the conversion table correspond to the inbound flow identifier (or the source address or the destination address of the inbound flow identifier) and the outbound flow identifier (or the source address or the destination address of the outbound flow identifier) in the third embodiment, respectively. The contents of the sections 4-6 can be applied to the third embodiment by converting the terms accordingly.

The invention claimed is:

1. A multicast delivery control apparatus which performs forwarding processing on a packet that is multicast-transmitted from a data transmission source by using a multicast address, comprising:

at least one network interface having signal ports for packet transmission and reception;

a conversion table for storing first multicast addresses that are designated by transmission sources and second multicast addresses to which users belong to whom data transmitted from transmission sources are to be delivered finally or who requested reception of data transmitted from transmission sources;

a multicast packet processing unit for converting a first multicast address of a received multicast packet to a second multicast address by referring to the conversion table, and for transmitting the address-converted multicast packet to a network interface having a signal port corresponding to the second multicast address; and a switch unit for interconnecting the at least one network interface, the conversion table, and the multicast packet processing unit.

2. The multicast delivery control apparatus according to claim 1, wherein the conversion table further stores signal port IDs corresponding to the first multicast addresses and the second multicast addresses; and wherein the multicast packet processing unit changes a destination address of a received multicast packet from a first multicast address to a second multicast address by referring to the conversion table, and forwards the multicast packet to signal ports having detected signal port IDs.

3. The multicast delivery control apparatus according to claim 1, further comprising:

a multicast group management table for storing correspondence between the second multicast addresses and packet 'destination signal port IDs; and a multicast group management protocol processing unit for retrieving signal port IDs of destination signal port for an address-converted multicast packet from the multicast group management table on the basis of the second multicast address, wherein the multicast packet processing unit changes a destination address of a received multicast packet from a first multicast address to a second multicast address by referring to the conversion table, and forwards the address-converted multicast packet to only signal ports having the signal port IDs retrieved by the multicast group management protocol processing unit.

4. The multicast delivery control apparatus according to claim 1, wherein the multicast packet processing unit is provided in each of the at least one network interface.

5. The multicast delivery control apparatus according to claim 1, further comprising a routing/switching management unit having the multicast packet processing unit, wherein the routing/switching management unit is interconnected to plural ones of the at least one network interface.

6. The multicast delivery control apparatus according to claim 1, further comprising a forwarding table lookup unit for storing information of the at least one network interface to which received packets should be forwarded, wherein each of the at least one network interface has a packet forwarding unit for generating a search key to be used in the forwarding table lookup unit by analyzing a header of a received packet.

7. The multicast delivery control apparatus according to claim 6, wherein the packet forwarding unit judges whether a destination address of a received multicast packet requires address conversion, and forwards the received multicast packet to the multicast packet processing unit if it requires address conversion.

8. The multicast delivery control apparatus according to claim 6, wherein the packet forwarding unit judges whether a destination address of a received multicast packet requires address conversion, and, if it does not require address conversion, searches the forwarding table lookup unit and forwards the received multicast packet to a hit network interface.

9. The multicast delivery control apparatus according to claim 3, wherein the multicast group management protocol processing unit outputs a multicast request or unrequest for a multicast address acquired by referring to the conversion table to a port to which an upper router is connected in response to updating of the multicast group management table.

10. The multicast delivery control apparatus according to claim 1, wherein the conversion table includes:

a user connection information table for storing user IDs of users of a multicast group to which multicast packets to be received belong and signal port IDs that are assigned to multicast packets belonging to the user IDs; and a user assignment table for storing the user IDs, inbound first multicast addresses that are assigned to the user IDs, and outbound second multicast addresses that are assigned to the user IDs, wherein the multicast packet processing unit performs address conversion on a received multicast packet by referring to the user connection information table and the user assignment table, acquires a signal port ID of a signal port to which the address-converted packet is forwarded by referring to the user connection information table, and forwards the address-converted packet to a network interface to which the signal port ID belongs.

11. The multicast delivery control apparatus according to claim 1, further comprising:

a conversion table update information table for storing inbound first multicast addresses, outbound second multicast addresses, and operations indicating addition or deletion; and a conversion table update information processing unit for updating the conversion table according to the conversion table update information table.

12. The multicast delivery control apparatus according to claim 11, further comprising a conversion table update information construction device for constructing the conversion table update information table.

13. The multicast delivery control apparatus according to claim 12, wherein the conversion table update information construction device comprises:

a user connection information table for storing user IDs of users of a multicast group to which a multicast packet to be received belongs, and signal port IDs that are assigned to a multicast packet belonging to the user IDs;

a user profile information table for storing profile information of users corresponding to the user IDs and user IDs corresponding to the profile information;

a profile assignment table for storing inbound first multicast addresses corresponding to the profile information, and outbound second multicast addresses corresponding to the profile information, and the profile information;

a profile group table for storing the profile information of users corresponding to the user IDs and signal port IDs corresponding to the user IDs;

a profile group information construction unit for constructing the profile group table by combining the user connection information table and the user profile information table on the basis of the user IDs; and conversion table update information construction unit for constructing a conversion table update information table including the inbound first multicast addresses corresponding to the profile information, the outbound second multicast addresses corresponding to the profile information, the signal port IDs that are assigned to multicast packets belonging to the user IDs, and operations indicating data addition or deletion by combining the profile group table and the profile assignment table.

14. The multicast delivery control apparatus according to claim 12, wherein the conversion table update information construction device comprises:

a user connection information table for storing user IDs of users of a multicast group to which a multicast packet to be received belongs and signal port IDs that are assigned to a multicast packet belonging to the user IDs;

a user profile information table for storing the user IDs and profile information of users corresponding to the user IDs;

a user group definition table for storing user group IDs and profile information of users for the user IDs;

a group assignment table for storing the user group IDs, inbound first multicast addresses corresponding to the user group IDs, and outbound second multicast addresses corresponding to the user group IDs;

a user group table for storing the user group IDs of users corresponding to the user IDs and signal port IDs corresponding to the user IDs;

a user group table construction' unit for constructing the user group table by combining the user connection information table, the user profile information table, and the user group definition table on the basis of the user IDs and the profile information; and conversion table update information construction unit for constructing a conversion table update information table including the inbound first multicast addresses corresponding to the user group IDs, the outbound second multicast addresses corresponding to the user group IDs, the signal port IDs that are assigned to multicast packets belonging to the user IDs, and operations indicating data addition or deletion by combining the user group table and the group assignment table.

15. A multicast delivery control method for performing forwarding processing on a packet that is multicast-transmitted from a data transmission source by using a multicast address, comprising the steps of:

receiving a multicast packet from a signal port; acquiring a list of second multicast addresses on the basis of a first multicast address of the received multicast packet by referring to a conversion table for storing first multicast addresses that are designated by transmission sources and second multicast addresses to which users belong to whom data transmitted from transmission sources are to be delivered finally or who requested reception of data transmitted from transmission sources;

determining destination signal ports on the basis of the second multicast addresses by referring to a multicast group management table for storing correspondence between the second multicast addresses and destination signal port IDs of packets; and changing a destination address of the received multicast packet to a second multicast address and forwarding the multicast packet to the signal ports.

16. A multicast delivery control method for performing forwarding processing on a packet that is multicast-transmitted from a data transmission source by using a multicast address, comprising the steps of:

receiving a multicast packet from a signal port;

acquiring a list of a second multicast address and destination signal ports on the basis of a first multicast address of the received multicast packet by referring to a conversion table for storing first multicast addresses that are designated by transmission sources, second multicast addresses to which users belong to whom data transmitted from transmission sources are to be delivered finally or who requested reception of data transmitted from transmission sources, and signal port IDs corresponding to the first multicast addresses and the second multicast addresses;

referring to a multicast group management table for storing correspondence between the second multicast addresses and destination signal port IDs of packets, and eliminating signal ports that do not exist in the multicast group management table from the list; and changing a destination address of the received multicast packet to the second multicast address and forwarding the multicast packet to the signal ports in the list.

17. The multicast delivery control method according to claim 15, further comprising:

a conversion table update information processing step of updating the conversion table according to a conversion table update information table for storing inbound first multicast addresses, outbound second multicast addresses, and operations indicating addition or deletion.

18. The multicast delivery control method according to claim 17, further comprising a conversion table update information construction step of constructing the conversion table update information table.

19. The multicast delivery control method according to claim 18, wherein the conversion table update information construction step comprises the substeps of:

receiving user connection information including user IDs of users of a multicast group to which a multicast packet to be received belongs and signal port IDs that are assigned to a multicast packet belonging to the user IDs;

receiving a user profile information table including profile information of users corresponding to the user IDs and the user IDs corresponding to the profile information;

receiving a profile assignment table including inbound first multicast addresses corresponding to the profile information, and outbound second multicast addresses corresponding to the profile information, and the profile information;

updating a profile group table for storing the profile information of users corresponding to the user IDs and signal port IDs corresponding to the user IDs on the basis of the user connection information and the user profile information table;

constructing a conversion table update information table including the inbound first multicast addresses corresponding to the profile information, the outbound second multicast addresses corresponding to the profile information, the signal port IDs that are assigned to multicast packets belonging to the user IDs, and operations indicating data addition or deletion on the basis of the profile assignment table, the profile group table, and the conversion table; and outputting the contents of the conversion table update information table.

20. The multicast delivery control method according to claim 18, wherein the conversion table update information construction step comprises the substeps of:
- receiving connection information including user IDs of users of a multicast group to which a multicast packet to be received belongs and signal port IDs that are assigned to a multicast packet belonging to the user IDs;
- receiving user profile information including the user group IDs and profile information of users corresponding to the user IDs;
- receiving a user group definition including user group IDs and profile information of users for the user IDs;
- receiving a group assignment table including inbound first multicast addresses corresponding to the user group IDs, and outbound second multicast addresses corresponding to the user group IDs;
- updating a user group table for storing the user group IDs corresponding to the user IDs and signal port IDs corresponding to the user IDs on the basis of the connection information, the user profile information table, and the user group definition;
- constructing a conversion table update information table including the inbound first multicast addresses corresponding to the user group IDs, the outbound second multicast addresses corresponding to the user group IDs, the signal port IDs that are assigned to multicast packets belonging to the user IDs, and operations indicating data addition or deletion on the basis of the group assignment table, the user group table, and the conversion table; and
- outputting the contents of the conversion table update information table.

21. A multicast delivery control apparatus which performs forwarding processing on a packet that is multicast-transmitted from a data transmission source by using a multicast address, comprising:
- at least one network interface having signal ports for packet transmission and reception;
- a conversion table for storing first flow identifiers including first source addresses representing server identifiers of transmission sources and first destination multicast addresses that are designated by the transmission sources for content delivery, and second flow identifiers corresponding to the first flow identifiers and including at least one of second source addresses and second destination multicast addresses that are used for multicast requests by users to receive multicast packets;
- a multicast packet processing unit for converting a first flow identifier of a received multicast packet to a second flow identifier by referring to the conversion table, and for transmitting the address-converted multicast packet to a network interface having a signal port ID corresponding to the second flow identifier; and
- a switch unit for interconnecting the at least one network interface, the conversion table, and the multicast packet processing unit.

22. A multicast delivery control apparatus which performs forwarding processing on a packet that is multicast-transmitted from a data transmission source by using a multicast address, comprising:
- at least one network interface having signal ports for packet transmission and reception;
- a conversion table for storing first flow identifiers including first source addresses representing server identifiers of transmission sources and first destination multicast addresses that are designated by the transmission sources for content delivery, and signal port IDs corresponding to the first flow identifiers;
- a multicast packet processing unit for forwarding a received multicast packet to signal ports having signal port IDs corresponding to a first flow identifier of the received packet by referring to the conversion table; and
- a switch unit for interconnecting the at least one network interface, the conversion table, and the multicast packet processing unit.

23. The multicast delivery control apparatus according to claim 21, wherein the conversion table further stores signal port IDs corresponding to the first flow identifiers and the second flow identifiers; and
wherein the multicast packet processing unit changes a destination address of a received multicast packet from a first flow identifier to a second flow identifier by referring to the conversion table, and forwards the multicast packet to signal ports having detected signal port IDs.

24. The multicast delivery control apparatus according to claim 21, further comprising:
- a multicast group management table for storing correspondence between the second destination multicast addresses of the second flow identifiers and packet destination signal port IDs; and
- a multicast group management protocol processing unit for retrieving signal port IDs of destination signal port for an address-converted multicast packet from the multicast group management table on the basis of the conversion-obtained second destination multicast address,
wherein the multicast packet processing unit forwards the packet to only signal ports having the signal port IDs retrieved by the multicast group management protocol processing unit.

25. The multicast delivery control apparatus according to claim 22, further comprising:
- a multicast group management table for storing correspondence between the first destination multicast addresses of the first flow identifiers and packet destination signal port IDs; and
- a multicast group management protocol processing unit for retrieving signal port IDs of destination signal port for a multicast packet from the multicast group management table on the basis of a first destination multicast address,
wherein the multicast packet processing unit forwards the packet to only signal ports having the signal port IDs retrieved by the multicast group management protocol processing unit.

26. The multicast delivery control apparatus according to claim 21, wherein the multicast packet processing unit is provided in each of the at least one network interface.

27. The multicast delivery control apparatus according to claim 21, further comprising a routing/switching management unit having the multicast packet processing unit and interconnected to plural ones of the at least one network interface.

28. The multicast delivery control apparatus according to claim 21, further comprising a forwarding table lookup unit for storing information of the at least one network interface to which received packets should be forwarded,
wherein each of the at least one network interface has a packet forwarding unit for generating a search key to be used in the forwarding table lookup unit by analyzing a header of a received packet.

29. The multicast delivery control apparatus according to claim 28, wherein the packet forwarding unit judges whether a destination address of a received multicast packet requires address conversion, and forwards the received multicast packet to the multicast packet processing unit if it requires address conversion.

30. The multicast delivery control apparatus according to claim 28, wherein the packet forwarding unit judges whether a received multicast packet needs to be processed by the multicast packet processing unit on the basis of a first source address and a first destination address of the received multicast packet, and, if it need not be processed by the multicast packet processing unit, searches the forwarding table lookup unit and forwards the received multicast packet to a hit network interface.

31. The multicast delivery control apparatus according to claim 25, wherein the multicast group management protocol processing unit outputs a multicast request or unrequest for a multicast address acquired by referring to the conversion table to a port to which an upper router is connected in response to updating of the multicast group management table.

32. The multicast delivery control apparatus according to claim 21, wherein the conversion table includes:
a user connection information table for storing user IDs of users of a multicast group to which multicast packets to be received belong and signal port IDs of signal ports to which the users having the user IDs are connected; and
a user assignment table for storing the user IDs, inbound first flow identifiers that are assigned to the user IDs, and outbound second flow identifiers that are assigned to the user IDs,
wherein the multicast packet processing unit performs address conversion on a received multicast packet by referring to the user assignment table, and forwards the address-converted packet to a network interface to which a signal port having a signal port ID acquired by referring to the user connection information table belongs.

33. The multicast delivery control apparatus according to claim 21, further comprising:
a conversion table update information table for storing inbound first flow identifiers, outbound second flow identifiers, and operations indicating addition or deletion; and
a conversion table update information processing unit for updating the conversion table according to the conversion table update information table.

34. The multicast delivery control apparatus according to claim 33, further comprising a conversion table update information construction device for constructing the conversion table update information table.

35. The multicast delivery control apparatus according to claim 34, wherein the conversion table update information construction device comprises:
a user connection information table for storing user IDs of users of a multicast group to which a multicast packet to be received belongs, and signal port IDs that are assigned to a multicast packet belonging to the user IDs;
a user profile information table for storing profile information of users corresponding to the user IDs and user IDs corresponding to the profile information;
a profile assignment table for storing inbound first flow identifiers corresponding to the profile information, and outbound second flow identifiers corresponding to the profile information, and the profile information;
a profile group table for storing the pieces of user profile information of users corresponding to the user IDs and signal port IDs corresponding to the user IDs;
a profile group information construction unit for constructing the profile group table by combining the user connection information table and the user profile information table on the basis of the user IDs; and
conversion table update information construction unit for constructing a conversion table update information table including the inbound first flow identifiers corresponding to the profile information, the outbound second flow identifiers corresponding to the profile information, the signal port IDs that are assigned to multicast packets belonging to the user IDs, and operations indicating data addition or deletion by combining the profile group table and the profile assignment table.

36. The multicast delivery control apparatus according to claim 34, wherein the conversion table update information construction device comprises:
a user connection information table for storing user IDs of users of a multicast group to which a multicast packet to be received belongs and signal port IDs that are assigned to a multicast packet belonging to the user IDs;
a user profile information table for storing the user IDs and profile information of users corresponding to the user IDs;
a user group definition table for storing user group IDs and profile information of users for the user IDs;
a group assignment table for storing the user group IDs, inbound first flow identifiers corresponding to the user group IDs, and outbound second flow identifiers corresponding to the user group IDs;
a user group table for storing the user group IDs of users corresponding to the user IDs and signal port IDs corresponding to the user IDs;
a user group table construction unit for constructing the user group table by combining the user connection information table, the user profile information table, and the user group definition table on the basis of the user IDs and the profile information; and
conversion table update information construction unit for constructing a conversion table update information table including the inbound first flow identifiers corresponding to the user group IDs, the outbound second flow identifiers corresponding to the user group IDs, the signal port IDs that are assigned to multicast packets belonging to the user IDs, and operations indicating data addition or deletion by combining the user group table and the group assignment table.

37. A multicast delivery control method for performing forwarding processing on a packet that is multicast-transmitted from a data transmission source by using a multicast address, comprising the steps of:
receiving a multicast packet from a signal port;
acquiring a list of second flow identifiers on the basis of a first flow identifier of the received multicast packet by referring to a conversion table for storing first flow identifiers including first source addresses representing server identifiers of transmission sources and first destination multicast addresses that are designated by the transmission sources for content delivery, and second flow identifiers corresponding to the first flow identifiers and including at least one of second source addresses and second destination multicast addresses that are used for multicast requests by users to receive multicast packets;

determining destination signal ports on the basis of the second flow identifiers in the list by referring to a multicast group management table for storing correspondence between the second flow identifiers and destination signal port IDs of packets; and changing a destination address of the received multicast packet to a second flow identifier and forwarding the multicast packet to the signal ports.

38. A multicast delivery control method for performing forwarding processing on a packet that is multicast-transmitted from a data transmission source by using a multicast address, comprising the steps of:

receiving a multicast packet from a signal port;

acquiring a list of destination signal ports on the basis of a first flow identifier of the received multicast packet, by referring to a conversion table for storing first flow identifiers including first source addresses representing server identifiers of transmission sources and first destination multicast addresses that are designated by the transmission sources for content delivery, and signal port IDs corresponding to the first flow identifiers;

forwarding the multicast packet to signal ports in the list.

39. The multicast delivery control method according to claim 16, further comprising:

a conversion table update information processing step of updating the conversion table according to a conversion table update information table for storing inbound first multicast addresses, outbound second multicast addresses, and operations indicating addition or deletion.

40. The multicast delivery control method according to claim 39, further comprising a conversion table update information construction step of constructing the conversion table update information table.

41. The multicast delivery control method according to claim 40, wherein the conversion table update information construction step comprises the substeps of:

receiving user connection information including user IDs of users of a multicast group to which a multicast packet to be received belongs and signal port IDs that are assigned to a multicast packet belonging to the user IDs;

receiving a user profile information table including profile information of users corresponding to the user IDs and the user IDs corresponding to the profile information;

receiving a profile assignment table including inbound first multicast addresses corresponding to the profile information, and outbound second multicast addresses corresponding to the profile information, and the profile information;

updating a profile group table for storing the profile information of users corresponding to the user IDs and signal port IDs corresponding to the user IDs on the basis of the user connection information and the user profile information table;

constructing a conversion table update information table including the inbound first multicast addresses corresponding to the profile information, the outbound second multicast addresses corresponding to the profile information, the signal port IDs that are assigned to multicast packets belonging to the user IDs, and operations indicating data addition or deletion on the basis of the profile assignment table, the profile group table, and the conversion table; and outputting the contents of the conversion table update information table.

42. The multicast delivery control method according to claim 40, wherein the conversion table update information construction step comprises the substeps of:

receiving connection information including user IDs of users of a multicast group to which a multicast packet to be received belongs and signal port IDs that are assigned to a multicast packet belonging to the user IDs;

receiving user profile information including the user group IDs and profile information of users corresponding to the user IDs;

receiving a user group definition including user group IDs and profile information of users for the user IDs;

receiving a group assignment table including inbound first multicast addresses corresponding to the user group IDs, and outbound second multicast addresses corresponding to the user group IDs;

updating a user group table for storing the user group IDs corresponding to the user IDs and signal port IDs corresponding to the user IDs on the basis of the connection information, the user profile information table, and the user group definition;

constructing a conversion table update information table including the inbound first multicast addresses corresponding to the user group IDs, the outbound second multicast addresses corresponding to the user group IDs, the signal port IDs that are assigned to multicast packets belonging to the user IDs, and operations indicating data addition or deletion on the basis of the group assignment table, the user group table, and the conversion table; and outputting the contents of the conversion table update information table.

43. The multicast delivery control apparatus according to claim 22, wherein the multicast packet processing unit is provided in each of the at least one network interface.

44. The multicast delivery control apparatus according to claim 22, further comprising a routing/switching management unit having the multicast packet processing unit and interconnected to plural ones of the at least one network interface.

45. The multicast delivery control apparatus according to claim 22, further comprising a forwarding table lookup unit for storing information of the at least one network interface to which received packets should be forwarded, wherein each of the at least one network interface has a packet forwarding unit for generating a search key to be used in the forwarding table lookup unit by analyzing a header of a received packet.

46. The multicast delivery control apparatus according to claim 45, wherein the packet forwarding unit judges whether a destination address of a received multicast packet requires address conversion, and forwards the received multicast packet to the multicast packet processing unit if it requires address conversion.

47. The multicast delivery control apparatus according to claim 45, wherein the packet forwarding unit judges whether a received multicast packet needs to be processed by the multicast packet processing unit on the basis of a first source address and a first destination address of the received multicast packet, and, if it need not be processed by the multicast packet processing unit, searches the forwarding table lookup unit and forwards the received multicast packet to a hit network interface.

48. The multicast delivery control apparatus according to claim 22, wherein the conversion table includes:
 a user connection information table for storing user IDs of users of a multicast group to which multicast packets to be received belong and signal port IDs of signal ports to which the users having the user IDs are connected; and
 a user assignment table for storing the user IDs, inbound first flow identifiers that are assigned to the user IDs, and outbound second flow identifiers that are assigned to the user IDs,
 wherein the multicast packet processing unit performs address conversion on a received multicast packet by referring to the user assignment table, and forwards the address-converted packet to a network interface to which a signal port having a signal port ID acquired by referring to the user connection information table belongs.

49. The multicast delivery control apparatus according to claim 22, further comprising:
 a conversion table update information table for storing inbound first flow identifiers, outbound second flow identifiers, and operations indicating addition or deletion; and
 a conversion table update information processing unit for updating the conversion table according to the conversion table update information table.

50. The multicast delivery control apparatus according to claim 49, further comprising a conversion table update information construction device for constructing the conversion table update information table.

51. The multicast delivery control apparatus according to claim 50, wherein the conversion table update information construction device comprises:
 a user connection information table for storing user IDs of users of a multicast group to which a multicast packet to be received belongs, and signal port IDs that are assigned to a multicast packet belonging to the user IDs;
 a user profile information table for storing profile information of users corresponding to the user IDs and user IDs corresponding to the profile information;
 a profile assignment table for storing inbound first flow identifiers corresponding to the profile information, and outbound second flow identifiers corresponding to the profile information, and the profile information;
 a profile group table for storing the pieces of user profile information of users corresponding to the user IDs and signal port IDs corresponding to the user IDs;
 a profile group information construction unit for constructing the profile group table by combining the user connection information table and the user profile information table on the basis of the user IDs; and
 conversion table update information construction unit for constructing a conversion table update information table including the inbound first flow identifiers corresponding to the profile information, the outbound second flow identifiers corresponding to the profile information, the signal port IDs that are assigned to multicast packets belonging to the user IDs, and operations indicating data addition or deletion by combining the profile group table and the profile assignment table.

52. The multicast delivery control apparatus according to claim 50, wherein the conversion table update information construction device comprises:
 a user connection information table for storing user IDs of users of a multicast group to which a multicast packet to be received belongs and signal port IDs that are assigned to a multicast packet belonging to the user IDs;
 a user profile information table for storing the user IDs and profile information of users corresponding to the user IDs;
 a user group definition table for storing user group IDs and profile information of users for the user IDs;
 a group assignment table for storing the user group IDs, inbound first flow identifiers corresponding to the user group IDs, and outbound second flow identifiers corresponding to the user group IDs;
 a user group table for storing the user group IDs of users corresponding to the user IDs and signal port IDs corresponding to the user IDs;
 a user group table construction unit for constructing the user group table by combining the user connection information table, the user profile information table, and the user group definition table on the basis of the user IDs and the profile information; and
 conversion table update information construction unit for constructing a conversion table update information table including the inbound first flow identifiers corresponding to the user group IDs, the outbound second flow identifiers corresponding to the user group IDs, the signal port IDs that are assigned to multicast packets belonging to the user IDs, and operations indicating data addition or deletion by combining the user group table and the group assignment table.

* * * * *